(12) United States Patent
Eden et al.

(10) Patent No.: US 9,893,486 B2
(45) Date of Patent: Feb. 13, 2018

(54) INJECTION-SEEDED WHISPERING GALLERY MODE OPTICAL AMPLIFIER DEVICES AND NETWORKS

(71) Applicant: The Board of Trustees of the University of Illinois, Urbana, IL (US)

(72) Inventors: J. Gary Eden, Champaign, IL (US); Manas Ranjan Gartia, Urbana, IL (US); Gang Logan Liu, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 397 days.

(21) Appl. No.: 14/574,912

(22) Filed: Dec. 18, 2014

(65) Prior Publication Data

US 2017/0025813 A1 Jan. 26, 2017

Related U.S. Application Data

(60) Provisional application No. 61/918,569, filed on Dec. 19, 2013.

(51) Int. Cl.
*H01S 3/16* (2006.01)
*H01S 3/10* (2006.01)
*H01S 3/30* (2006.01)
*H01S 3/108* (2006.01)
*H01S 3/06* (2006.01)
*H01S 3/08* (2006.01)

(52) U.S. Cl.
CPC .......... *H01S 3/10092* (2013.01); *H01S 3/108* (2013.01); *H01S 3/169* (2013.01); *H01S 3/30* (2013.01); *H01S 3/0627* (2013.01); *H01S 3/08022* (2013.01); *H01S 3/168* (2013.01)

(58) Field of Classification Search
CPC ...... H01S 3/10092; H01S 3/108; H01S 3/169; H01S 3/30; H01S 3/0627; H01S 3/08022; H01S 3/168
See application file for complete search history.

(56) References Cited

U.S. PATENT DOCUMENTS

| | | | |
|---|---|---|---|
| 7,283,707 B1 | 10/2007 | Maleki et al. | |
| 7,813,390 B2 | 10/2010 | Luo et al. | |
| 7,991,025 B2 | 8/2011 | Maleki et al. | |
| 2002/0080842 A1 | 6/2002 | An et al. | |
| 2007/0025409 A1* | 2/2007 | Yang | H01S 3/0632 372/67 |

(Continued)

OTHER PUBLICATIONS

Choi Y. et al. Ultrahigh-Q microsphere dye laser based on evanescent-wave coupling. J. Kor. Phys. Soc. 39, 928-931 (2001).*

(Continued)

*Primary Examiner* — Xinning Niu
(74) *Attorney, Agent, or Firm* — Greer, Burns & Crain, Ltd.; Steven P. Fallon

(57) ABSTRACT

An injection-seeded whispering gallery mode optical amplifier. The amplifier includes a micro or nanoscale whispering gallery mode resonator configured to amplify a whispering gallery mode therein via a gain medium separated from the whispering gallery mode resonator but within the evanescent field of the whispering gallery mode resonator. A pump stimulates the whispering gallery mode. A plasmonic surface couples power into the whispering gallery mode resonator.

28 Claims, 20 Drawing Sheets

(56) References Cited

U.S. PATENT DOCUMENTS

| | | | | |
|---|---|---|---|---|
| 2008/0089367 | A1* | 4/2008 | Srinivasan | B82Y 20/00 372/19 |
| 2010/0053755 | A1* | 3/2010 | Lee | B82Y 20/00 359/577 |
| 2011/0278441 | A1* | 11/2011 | Vermeulen | G02B 6/124 250/227.23 |
| 2012/0224255 | A1 | 9/2012 | Bora et al. | |
| 2013/0070799 | A1 | 3/2013 | Lee et al. | |

OTHER PUBLICATIONS

Ahn, et al., "Anomalous Band Formation in Arrays of Terahertz Nanoresonators", Physica Review Letters, 106, (2011), pp. 013902-1-013902-4.

Cai, M., et al., "Fiber-coupled microsphere laser", Optics Letters, vol. 25, No. 19, Oct. 1, 2000, pp. 1430-1432.

Choi, Y., et al., "Ultrahigh-Q Microsphere Dye Laser Based on Evanescent-Wave Coupling", Journal of the Korean Physical Society, vol. 39, No. 5, (Nov. 2001), pp. 928-931.

Farkas, A.M., et al., "Pulsed dye amplification and frequency-doubling of single longitudinal mode semiconductor-lasers", IEEE J. Quant. Electron., vol. 29, Issue 12, (Dec. 1993), pp. 2923-2927.

Grudinin, I.S., et al., "Brillouin Lasing with a CaF2 Whispering Gallery Mode Resonator", Phsy. Rev. Lett., 102, (Jan. 2009) pp. 043902-1-043902-4.

Hartnett, J.G., et al., "Cryogenic sapphire oscillator with exceptionally high long-term frequency stability", Appl. Phys. Lett., 89, (2006), pp. 203513 (7 pages).

Kuwata-Gonokami, M., et al., "Laser-Emission from Dye-Doped Polystyrene Microsphere", Japanese J Appl. Phys. vol. 31, Part 2, No. 2A, (1992), pp. L99-L101.

Kuwata-Gonokami, M., et al., "Polymer whispering gallery mode lasers", Opt. Mater., vol. 9, Issues 1-4, (Jan. 1998), pp. 12-17.

Lin, H., et al., "Microcavity enhanced Raman gain", Opt. Commun., vol. 133, Issues 1-6, Jan. 1, 1997, pp. 287-292.

Nie, S., et al., "Probing single molecules and single nanoparticles by surface-enhanced Raman scattering", Science, vol. 275, No. 5303, Feb. 21, 1997, pp. 1102-1106.

Sandoghdar, V., et al., "Very low threshold whispering-gallery-mode microsphere laser", Phsy. Rev. A, vol. 54, No. 3, Sep. 1, 1996, pp. R1777-R1780.

Suh, J.Y., et al., "Plasmonic Bowtie Nanolaser Arrays", Nano Lett., 12, (2012), pp. 5769-5774.

Zhou, W. et al., "Lasing action in strongly coupled plasmonic nanocavity arrays", Nature Nanotech, vol. 8, (Jul. 2013), pp. 506-511.

Oxborrow, M., "Traceable 2D finite-element simulation of the whispering-gallery modes of axisymmetric electromagnetic resonators", IEEE Trans. Microw. Theory Tech., vol. 55, Issue 6, (2007), pp. 1209-1218.

Spillane, S. M., et al., "Ultralow-threshold Raman laser using a spherical dielectric microcavity", Nature, vol. 415, Feb. 7, 2002, pp. 621-623.

Trocolli, M., et al., "Raman injection laser", Nature, vol. 433, Feb. 24, 2005, pp. 845-848.

Ausman, L. K., et al., "Whispering-gallery mode resonators: Surface enhanced Raman scattering without plasmons", J. Chem. Phys., 129, (2008), p. 054704-1-054704-10.

White, I., et al., "Increasing the enhancement of SERS with dielectric microsphere resonators", Spectroscopy, vol. 21, Issue 4, (2006), pp. 36-42.

Zou, S., et al., "Combining micron-size glass spheres with silver nanoparticles to produce extraordinary field enhancements for surface-enhanced Raman scattering applications", Isr. J. Chem., vol. 46, Issue 3, (2006), pp. 293-297.

Oulton, R. F., et al., "Plasmon lasers at deep subwavelength scale", Nature, vol. 461, Oct. 1, 2009, pp. 629-632.

Van Exter, M.P., et al., "Surface Plasmon Lasing Observed in Metal Hole Arrays", Optics Express, vol. 21, No. 22, Nov. 4, 2013, pp. 27422-27437.

Stockman, M. I., "The spaser as a nanoscale quantum generator and ultrafast amplifier", J Opt., 12, 024004 (2010), (13 pages).

Koenderink, A. F., "On the use of Purcell factors for plasmon antennas" Opt. Lett. 35, (2010), pp. 4208-4210.

Sorger, V. J., et al., "Plasmonic Fabry-Perot Nanocavity", Nano Letters vol. 9, No. 10, May 27, 2009, pp. 3489-3493.

Kinkhabwala, A., et al., "Large single-molecule fluorescence enhancements produced by a bowtie nanoantenna", Nature Photonics, vol. 3, Nov. 2009, pp. 654-657.

Gartia, M. R., et al., "Lifetime imaging of radiative and nonradiative fluorescence decays on nanoplasmonic surface", Appl. Phys. Lett. 101, Jul. 13, 2012, 023118-1-023118-5.

Punj, D. et al., "A plasmonic 'antenna-in-box' platform for enhanced single-molecule analysis at micromolar concentrations", Nature Nanotechnology, 8, Jun. 9, 2013, pp. 512-516.

Consales, M., et al, "Lab-on-Fiber Technology: Toward Multifunctional Optical Nanoprobes", ACS Nano 6 (4), Mar. 8, 2012, pp. 3163-3170.

Garrett, C., et al., "Stimulated Emission into Optical Whispering Modes of Spheres", Phys. Rev. 124, Dec. 15, 1961, pp. 1807-1811, (5 pages).

Tzeng, H., et al., "Laser-Emission from Individual Droplets at Wavelengths Corresponding to Morphology-Dependent Resonances", Opt. Lett. vol. 9, Issue 11, (1984), pp. 499-501.

Vollmer, F., et al., "Whispering-gallery-mode biosensing: label-free detection down to single molecules", Nature Methods, vol. 5, No. 7, (Jul. 2008), pp. 591-596.

Gerard, D., et al., "Strong electromagnetic confinement near dielectric micro spheres to enhance single-molecule fluorescence", Optics Express, vol. 16, No. 19, Sep. 15, 2008, pp. 15297-15303.

Kim, W., et al., "Fractals in microcavities: Giant coupled,multiplicative enhancement of optical responses", Phys. Rev. Lett., vol. 82, No. 24, Jun. 14, 1999, pp. 4811-4814.

Sachenkov, A. A., et al., "Optical resonators with ten million finesse", Optics Exprss, vol. 15, No. 11, May 28, 2007, pp. 6768-6773.

Shopova, S.I., et al., "Enhanced evanescent coupling to whispering-gallery modes due to gold nanorods grown on the microresonator surface", Applied Physics B, Lasers and Optics, 93, (2008), pp. 183-187.

Fuller, K. A., et al., "Cascaded photoenhancement from coupled nanoparticle and micro cavity resonance effects", Optics Express, vol. 15, No. 6, Mar. 19, 2007, pp. 3575-3580.

Swaim, J. D., et al., "Detection limits in whispering gallery biosensors with plasmonic enhancement", Appl. Phys. Lett. 99, (2011), pp. 243109-1-243109-3.

Shopova, S. I., et al., "Plasmonic enhancement of a whispering-gallery-mode biosensor for single nanoparticle detection", Applied Physics Letters, 98, (2011), pp. 243104-1-243104-3.

Santiago-Cordoba, M. A., et al., "Nanoparticle-based protein detection by optical shift of a resonant microcavity", Applied Physics Letters, 99, (2011), pp. 073701-1-073701-3.

Ahn, W., et al., "Demonstration of efficient on-chip photon transfer in self-assembled optoplasmonic networks.", ACS Nano 7, (2013), pp. 4470-4478.

Zheng, J., et al., "Tunable ring laser with internal injection seeding and an optically-driven photonic crystal reflector", Optics Express, vol. 20, No. 13, Jun. 18, 2012, pp. 14292-14301.

Cornell, S, et al., "Laser-Excited Raman Scattering in Polystyrene.", J Appl. Phys., vol. 39, Issue 11, (1968), pp. 4883-4890.

Fagnano, C., et al., "Raman-Spectroscopic Study of the Avidin-Biotin Complex", J Raman Spectrosc., vol. 26, Issue 11, (Nov. 1995), pp. 991-995.

Venkateswaran, C. S., et al., "The Raman spectra of organic compounds: Diethyl disulphide", Proc. Indian Acad. Sci.—Section A, vol. 15, Issue 5, (May 1942), pp. 396-400.

Neish, C. S., et al., "Direct visualization of ligand protein interactions using atomic force microscopy", British Journal of Pharmacology, vol. 135 (8), (2002), pp. 1943-1950.

(56) References Cited

OTHER PUBLICATIONS van Munster, E., et al., "Fluorescence lifetime imaging microscopy (FLIM)", Microscopy Techniques, vol. 95 of the series Advances in Biochemical Engineering, May 27, 2005, pp. 143-175.
International Search Report dated Sep. 15, 2015.

* cited by examiner

INJECTION-SEEDED WHISPERING GALLERY MODE OPTICAL AMPLIFIER DEVICES AND NETWORKS

PRIORITY CLAIM AND REFERENCE TO RELATED APPLICATION

The application claims priority under 35 U.S.C. § 119 and all applicable laws and treaties from prior provisional application Ser. No. 61/918,569, which was filed Dec. 19, 2013.

STATEMENT OF GOVERNMENT INTEREST

This invention was made with government support under grant no. FA95550-12-1-0012 awarded by the U.S. Air Force Office of Scientific Research. The government has certain rights in the invention.

FIELD

Fields of the invention include nanophotonics, micro-optics, and optical amplifiers. Example applications of the invention include microscale optical and optical/electronic networks on a chip. Additional example applications and optical sensors of biomolecules and processes include routing narrowband optical power on a chip.

BACKGROUND

Optical communication is in widespread use, such as in telephonic and data networks. Fiber optic networks efficiently and reliably handle massive amounts of voice and data communications. The benefits of optical communications compared to wired communications are well known, and include higher speed, larger bandwidth and reduced vulnerability to interference.

These known advantages have created significant interest in micro and nanoscale optical devices and systems. Several applications for such devices and systems provide the impetus for research and development of new optical amplifiers. Over the past two decades, considerable effort has, therefore, been directed toward developing such nanoscale and microscale optical amplifiers but those available suffer from one or more drawbacks. For example, conventional micro/nano optical amplifiers include semiconductor based devices that require sophisticated and expensive fabrication systems such as MOCVD or MBE reactors, and focused ion beam and plasma etching tools. Furthermore, semiconductor optical amplifiers are restricted to specific spectral regions that are dictated by the electronic structure of the material. Other microscale and nanoscale optical amplifiers often produce a host of emission (spectral) lines and present impractical integration issues.

Most of the amplifiers and optical lasers (oscillators) that have been demonstrated to date are based on the III-V or II-VI semiconductors. These devices generally have thin layers of semiconductor materials that are bounded by mirrors (often a stack of thin films) or are encapsulated by metal. One drawback of these devices is the inherently complex and expensive fabrication processes, and equipment, for formation of one or more optical emitters, and the requirement that the layers forming the gain medium must be crystalline. Another drawback is that the semiconductors are inherently limited to specific regions of the visible, ultraviolet, and near-infrared.

Other types of microlasers and amplifiers have been reported in which a gain medium is provided in conjunction with a whispering gallery mode (WGM) resonator. The resonator can be shaped as a sphere, ring, or toroid. For example, a group at the California Institute of Technology has obtained lasing in glass microspheres made from Er-doped glass. The first lasers of this type were a calcium difluoride crystalline sphere (in the early 1960s) and, subsequently, droplets of a solvent into which laser dye was dissolved. Such lasers do not require a conventional optical resonator because the optical mode circulates within the resonator, around its periphery. A gain medium combined with a solvent is impractical for many applications. Also, coupling power out of a resonator medium often requires a tangential waveguide or a tapered fiber, and is difficult to accomplish reliably. Another concern is that the output spectrum is often multi-line. This is a serious drawback for on-chip communications, computing, or sensing applications.

Whispering gallery mode resonators have been studied in the microscale. Pump thresholds of only a few photons per whispering gallery mode have been observed, and Raman gain coefficients for a nonlinear whispering gallery mode resonator are increased by two orders of magnitude relative to bulk values. See, Lin, H. & Campillo, A. Microcavity enhanced Raman gain. *Opt. Commun.* 133, 287-292 (1997). Ahn et al. employed plasmonic nanoantennas to deliver optical radiation, by free-space transmission, to a spherical resonator with a coupling efficiency of 44%. Aligned with the equatorial plane of the microsphere, the nanoantennas were separated from the sphere surface by a mean distance of ~100-150 nm and radiated into the evanescent optical field of the resonator. Toroidal resonators have also been demonstrated by the Vahala Research Group at the California Institute of Technology.

Plasmonic structures have also been considered and demonstrated to act as nanoscale and microscale amplifiers and lasers. These structures have been shown to be effective as nanoantennas for both lasers and fluorescent optical sources. See, e.g. Suh, J. Y. et al., "Plasmonic Bowtie Nanolaser Arrays," *Nano Lett.* 12, 5769-5774 (2012); Zhou, W. et al., "Lasing action in strongly coupled plasmonic nanocavity arrays," *Nature Nanotech.* 8, 506-511 (2013). A drawback is that plasmonic sources are typically of low Q as a result of dissipative losses. Nevertheless, enhancements of orders of magnitude in the local electric field strength are available with plasmonic nanostructures in the form of (for example) bowties, spheres, cylinders, or cones, an attribute that is responsible for the detection of single nanoparticles and molecules by Raman scattering. Nie, S. & Emery, S., "Probing single molecules and single nanoparticles by surface-enhanced Raman scattering. *Science* 275, 1102-1106 (1997).

Some approaches have combined the resonator and gain medium. See, e.g., Sandoghdar, V. et al., "Very low threshold whispering-gallery-mode microsphere laser," *Phys. Rev. A* 54, R1777-R1780 (1996); Kuwata-Gonokami, M., Takeda, K., Yasuda, H. & Ema, K. Laser-emission from dye-doped polystyrene microsphere. *Japanese J. Appl. Phys. Part 2-Lett.* 31, L99-L101 (1992); Cai, M., Painter, O., Vahala, K. J. & Sercel, P. C., "Fiber-coupled microsphere laser," *Opt. Lett.* 25, 1430-1432 (2000). Combining the resonator and gain medium is advantageous from the perspective of minimizing the overall volume of the emitter. However, integrating the gain medium and resonator precludes the opportunity to optimize separately the performance of either element. This is particularly true for crystalline microresonators for which controllable doping of the resonator material with the lasant species is problematic. See, e.g., Hartnett, J. G., Locke, C. R., Ivanov, E. N., Tobar, M. E. & Stanwix, P. L., "Cryogenic sapphire oscillator with exceptionally high long-term frequency stability," *Appl. Phys. Lett.* 89, 203513 (2006) "Grudinin, I. S., Matsko, A. B. & Maleki, L., "Brillouin lasing with a $CaF_2$ whispering gallery mode resonator," *Phys. Rev. Lett.* 102, 043902 (2009).

In virtually all existing micro- and nano-scale optical amplifiers and lasers, the optical intensity builds up from the spontaneous emission background, also known as "the noise", but doing so limits the temporal coherence of the output radiation.

Injection seeding is a concept that has been used in various devices to introduce weak optical fields into gain media, such as injecting a laser signal into a bulk dye, for the purpose of overcoming the noise quickly, and, thereby, building the optical field intensity more rapidly. See, Farkas, A. M. & Eden, J. G., "Pulsed dye amplification and frequency-doubling of single longitudinal mode semiconductor-lasers," *IEEE J. Quant. Electron.* 29, 2923-2927 (1993).

Despite these efforts and advances, the functionality of existing hybrid optoplasmonic systems has been limited. As an example, the existing systems have failed to provide a narrow linewidth emitter integrated with a broadband amplifier. In prior efforts, the amplifier Q had been constrained by the whispering gallery mode resonator. See, Choi, Y. et al., "Ultrahigh-Q microsphere dye laser based on evanescent-wave coupling. *J. Kor. Phys. Soc.* 39, 928-931 (2001); Kuwata-Gonokami, M. & Takeda, K. Polymer whispering gallery mode lasers. *Opt. Mater.* 9, 12-17 (1998).

SUMMARY OF THE INVENTION

An embodiment of the invention is an injection-seeded, whispering gallery mode optical amplifier. The amplifier includes a micro or nanoscale whispering gallery mode resonator configured to amplify a whispering gallery mode therein via a gain medium separated from the whispering gallery mode resonator but within the evanescent field of the whispering gallery mode resonator. An optical pump source produces Raman radiation within the resonator that is subsequently amplified by the gain medium that is excited by the same optical source. A plasmonic surface couples power into the whispering gallery mode resonator.

DETAILED DESCRIPTION OF THE PREFERRED EMBODIMENTS

Figure 1A:
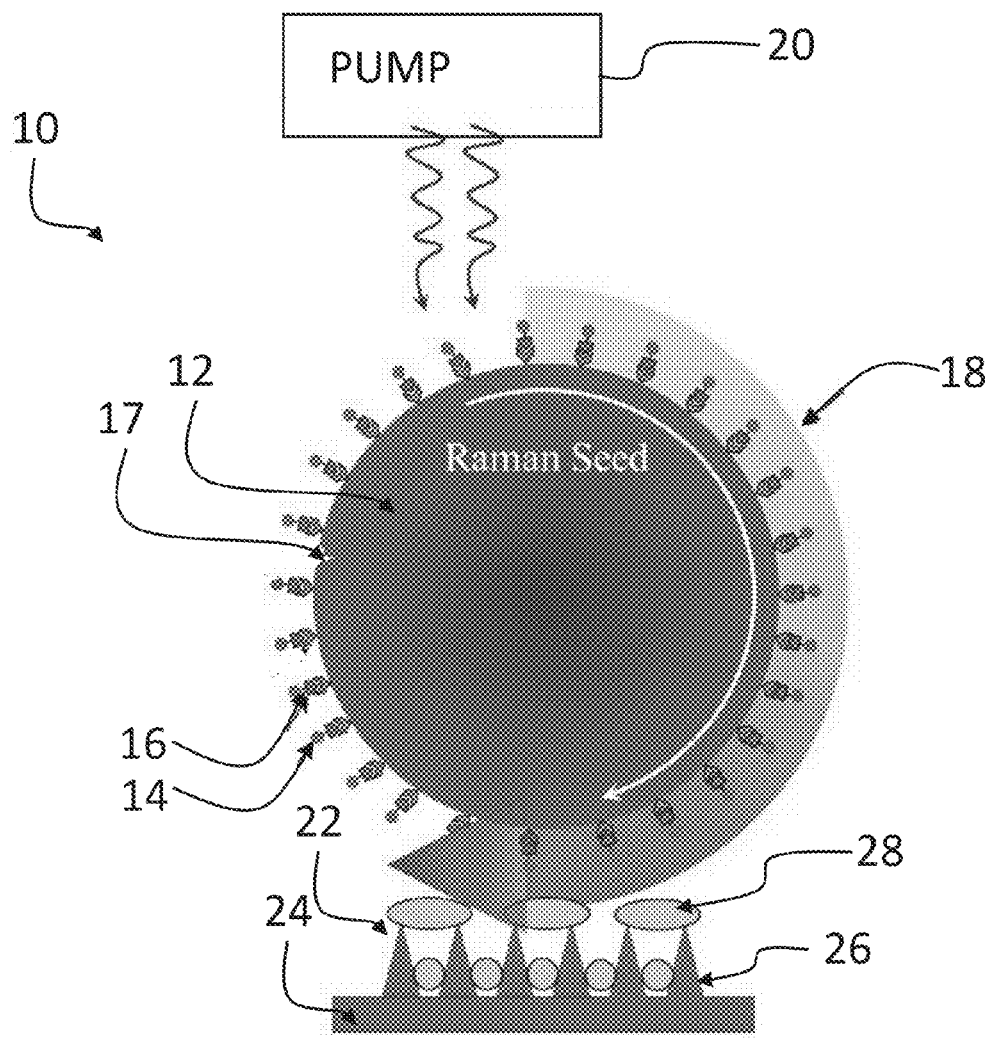
FIG. 1A is a schematic diagram of a preferred embodiment injection-seeded, whispering gallery mode amplifier of the invention.

Preferred embodiment optical amplifiers of the invention can have micro or nanoscale dimensions. A preferred embodiment optical amplifier includes a micro-optical resonator, a plasmonic surface and a gain medium. The plasmonic surface can be provided, for example, by an array of metal nanoparticles, metal-coated nanocones, etc. The resonator is configured to provide a circulating optical field and the gain medium is arranged so as to permit this medium to interact with optical power circulating within the resonator. The amplifier is injection-seeded by an optical signal generated internally to the amplifier. This seed signal can be produced by a nonlinear optical process, such as Raman scattering, four wave mixing, or second harmonic generation and is amplified by the gain medium that is in contact with, or in close proximity to, the surface of the resonator. The amplifier is optically pumped. In preferred embodiments, a plasmonic array serves to introduce optical pump power into the whispering gallery mode resonator and to extract optical emission from the resonator. In preferred embodiments, the plasmonic array is an aperiodic or periodic array of nanocones or metal-coated nanowires.

Preferred amplifiers of the invention provide a narrow linewidth emitter integrated with a broadband amplifier. Preferred embodiments of the invention provide microscale or nanoscale optically-pumped photonic/plasmonic amplifiers that are injection-seeded by Raman radiation generated internally to a whispering gallery mode resonator, such as a micro or nanoscale spherical, cylindrical, ring or toroidal resonator. Amplifiers of the invention can be designed to provide optical gain in the visible, ultraviolet, or near-infrared spectral regions with a gain medium (such as dye molecules or quantum dots) closely associated with a surface of the resonator, such as by being attached to the resonator by a protein. Power is coupled out of the gain medium by a plasmonic array in close proximity to, or in contact with, the resonator.

Situating the gain medium in proximity to the resonator while physically separating the gain medium itself from the resonator ensures that power stored in the gain medium is efficiently extracted by the optical field circulating in the resonator. Because of the narrow linewidth of the injection seed that is available with Raman scattering and the potential for energy storage in the gain medium surrounding the resonator, the coherence and output power of an amplifier of the invention can be superior to those of existing nano/micro optical sources. Amplifiers of the invention can provide a single, narrow bandwidth emission line by injection-locking. Preferred devices of the invention can provide for the generation and amplification of coherent light (radiation). Other preferred lasers and amplifiers can provide generation and amplification in the ultraviolet (UV) region. Additional preferred amplifiers can provide generation and amplification in the infrared region of the electromagnetic spectrum.

Amplifiers of the invention can benefit and enable efficient operations in many applications. Particular example applications that would benefit from amplifiers provided by embodiments of the invention include optical communications and optical interconnects at the backplane of computers. Efforts toward optical computing, for example, can benefit enormously from the availability of microscopic optical amplifiers that can be configured as arrays having a predetermined geometry, as provided by preferred embodiments of the invention.

Amplifiers of the invention can also benefit sensing applications by providing biosensors having a microscopic amplifier, or an array of amplifiers, that emit a signal that depends upon its local environment. Micro/nano optical amplifiers buried in human or animal tissue or another strongly scattering medium, for example, can be designed to transmit a signal in the near-infrared to a detector external to the scattering medium. Lasers and amplifiers of the invention can be designed to produce optical signals that minimize interference from a medium or environment in which the laser or amplifiers are embedded.

Preferred embodiments of the invention provide compound optoplasmonic devices. A specific preferred device is an optically-pumped photonic/plasmonic amplifier that is injection-seeded by narrow bandwidth radiation provided by Raman scattering ($1^{st}$ Stokes) of a pump by a resonator medium (e.g., polystyrene in a preferred embodiment) or, if desired, another component of the amplifier (protein tether, substrate, etc.). Injecting a seed signal into the amplifier effectively decouples the system Q from the resonator. The amplifier Q is no longer constrained by the whispering gallery mode resonator, but rather can be dictated by the pump laser linewidth and the Raman mode providing the seed radiation.

The inventors have identified drawbacks of prior approaches that have the gain medium in direct contact with a whispering gallery mode resonator or at the perimeter of a whispering gallery mode resonator. Embodiments of the invention decouple the system Q from the resonator. This is advantageous when compared to having the gain medium in direct contact with the resonator, as in Choi, Y. et al., "Ultrahigh-Q microsphere dye laser based on evanescent-wave coupling. *J. Kor. Phys. Soc.* 39, 928-931 (2001). Several prior approaches constrain the system Q to that of the resonator itself. Kuwata-Gonokami, M. & Takeda, K. Polymer whispering gallery mode lasers. *Opt. Mater.* 9, 12-17 (1998).

In contrast, in the invention, a gain medium is located proximate to the surface of a whispering gallery mode resonator. In preferred embodiments, dye molecules or quantum dots act as a gain medium. Dye molecules (for example) are tethered to the resonator surface but are held at a predetermined distance away from the resonator surface. This increases the effective lifetime of the excited singlet state of the dye molecule and, therefore, the energy stored by the medium Importantly, tethering the dye to the resonator at a proximate distance from the surface of the resonator ensures that the entire gain medium lies well within the evanescent field associated with power circulating in the micro resonator. This nano/micro-optical system behaves in a manner similar to that of macroscopic master oscillator-power amplifiers (MOPAs), and experimental results support the extraction of optical power from the gain medium, surrounding a whispering gallery mode resonator, by a narrow band injection seed. The advance of the invention does not depend upon the following belief, but the inventors are not aware of any prior effort that extracts optical power in this manner.

Preferred embodiments of the invention will now be discussed with respect to the drawings. The drawings may include schematic representations, which will be understood by artisans in view of the general knowledge in the art and the description that follows.

FIG. 1A illustrates a preferred embodiment optical amplifier 10 of the invention. The amplifier 10 includes a microscale or nanoscale optical whispering gallery mode resonator 12. An example resonator is a polystyrene microsphere. An example diameter of the microsphere is 2 µm but diameters of several hundred nm to several hundred µm can be used in other embodiments and are commercially available in glass and polymers, such as polystyrene. Generally, optically transmissive materials are suitable, and include glass, polymers and crystals, e.g., quartz, $CaF_2$ and sapphire. In particularly preferred embodiments, the microsphere is in the range of 0.5 to 50 micrometers. The preferred whispering gallery mode resonator 12 is a microsphere, such as a polymer microsphere, but whispering gallery mode resonators of other shapes, such as rings, cylinders, discs and toroids can be used. Other preferred embodiments include glass or crystal spheres with a sub-50 µm diameter. The resonator 12 is a medium and structure in which the optical field intensity builds. A gain medium 14 is tethered by tethers 16 to the resonator 12. In preferred embodiments, the gain medium 14 is realized with dye molecules and the tethers 16 are realized with a protein binder such as biotin/avidin. Other preferred gain media include, for example, quantum dots or rare earth=doped nanocrystals. The gain medium 14 is held proximate to the resonator 12, physically separated from the resonator, but held within a predetermined distance range away from a surface 17 of the resonator by the tethers 16. The predetermined distance range lies within an evanescent optical field 18 of the resonator 12. Although the gain medium 14 is external to surrounding the resonator 12, it is situated well within the evanescent optical field 18 of the resonator 12. In example experimental devices, the evanescent field nominally extends 200 nm beyond the surface of the resonator. Specific whispering gallery modes associated with the resonator 12 harvest energy efficiently from the gain medium 14, which is optically pumped by an optical pump 20. The optical pump can be a laser or an incoherent source. An example suitable incoherent source is a focused LED source, which can also produce Raman radiation within the resonator. Microplasma devices are another example, and have been shown experimentally to photoexcite quantum dots. The pump 18 irradiates the resonator 12 and some of the pump radiation is absorbed by both the gain medium 14 and the whispering gallery mode resonator 12. A plasmonic array 22 couples pump power (by scattering) into the resonator 12. Optical power absorbed by the resonator 12 generates a Raman signal that circulates within the resonator 12 as a whispering gallery mode or a plurality of modes. The gain medium amplifies the stimulated Raman signal when the Raman line(s) lie within the gain bandwidth of the gain medium. Power is coupled out of the resonator by the plasmonic array 22, which is situated upon substrate 24. Optical power can also be coupled out by one or more contiguous whispering gallery mode resonators. The plasmonic array 22 contacts a portion of the surface 17 of the resonator 12, although they are shown as slightly separated for clarity in the illustration of the separate parts in FIG. 1A. The plasmonic array 22 also serves to strengthen the local electric field within the resonator, thereby enhancing the generation of the Raman seed radiation. This arises from contact with a portion of the micro resonator surface 17, which serves to strengthen the local electric field inside the microresonator, and thereby enhance the generation of the Raman seed radiation. The array 22 includes nanocones 26 and metal nano globules 28 upon the nanocones 26. Additionally, nanospheres 30 are distributed between the nanocones 26.

The plasmonic array 22 can also be realized with other structures. Any metal structure that has dimensions substantially smaller than the wavelength of the light with which it is interacting will enhance the local electric field. Therefore, any nano-sized metal object can be used, e.g., nano wires, nano cylinders, pyramids, spheres, etc. Preferably, the radius of curvature of the surface closest to the microresonator is as small as possible (typically on the order of a few nm) The plasmonic effect requires a metal (usually silver or gold). Other materials can be used to form the nanostructure, e.g., semiconductors, dielectrics, etc. but then the nanostructures are overcoated with a metal, such as Ag or Au.

Figure 1B:
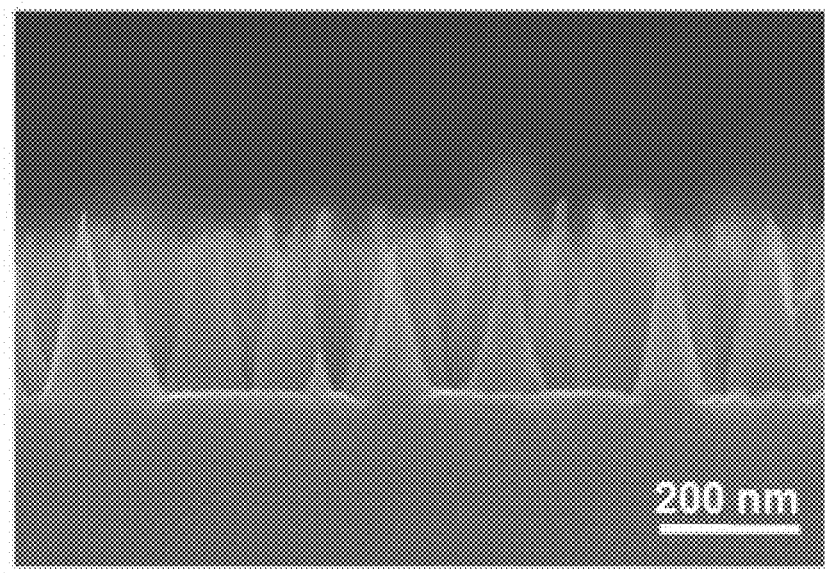
FIG. 1B is an SEM image that shows an experimental nanocone plasmonic array that was formed on a four inch diameter silicon wafer.
Figure 1C:
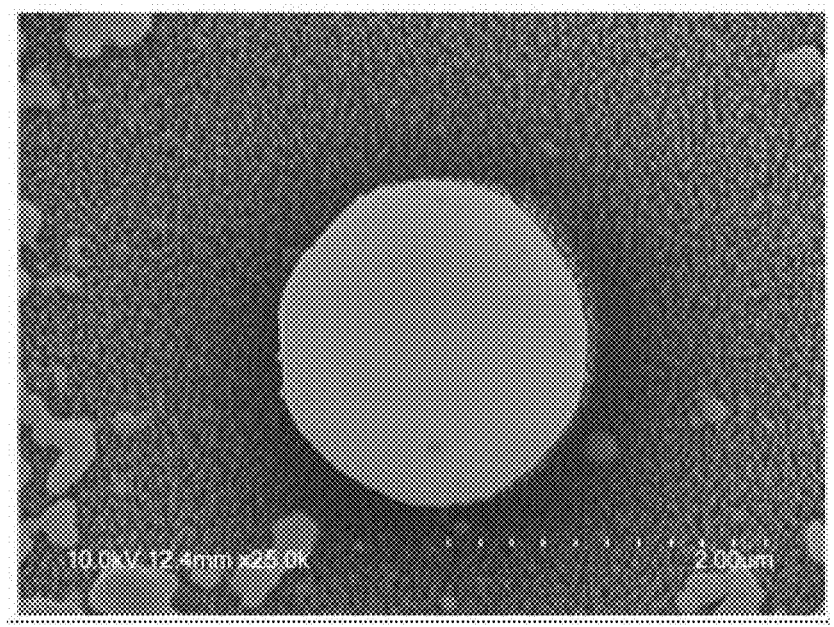
FIG. 1C is an SEM image that shows a single microsphere resonator having a 2 μm diameter, and lying on a plasmonic array consistent with the amplifier of FIG. 1A.

FIG. 1B shows an experimental nanocone plasmonic array that was formed on a four inch diameter silicon wafer. FIG. 1C shows a single microsphere resonator having a 2 μm diameter. The experimental structure is consistent with FIG. 1A and includes an Ag globule coating that is approximately 80 nm in thickness.

The preferred amplifier 10 provides advantages compared to prior whispering gallery mode, and other, microscale and nanoscale optical amplifiers. One advantage is a narrow linewidth of the seed signal that is provided by Raman scattering, which results in the coherence and Q of this amplifier potentially being superior to that of existing microamplifiers. Because the amplifier output does not build up from the noise, the coincidence of the Raman seed radiation with a particular resonator mode has the effect of discriminating against all other modes, thereby providing control over the output spectrum. With proper choice of the amplifier parameters, the energy stored under the amplifier gain profile is extracted predominantly in a single line by injection-locking. Secondly, because the energy stored in the gain medium is dependent upon the lifetime of the upper state, matching the photon lifetime of the microresonator to the excited state lifetime of the gain medium will maximize the energy that can be stored in the gain medium and, thus, the energy potentially available for extraction from the amplifier. In most conventional micro-optical amplifiers, the gain medium is integrated with the resonator and optimization of the gain medium's upper state lifetime relative to the photon lifetime of the resonator is not an option. Yet another advantage is that embodiments of the invention are capable of emitting a single line as opposed to the highly-multiline output that is characteristic of many conventional microscale and nanoscale optical amplifiers. Power is not built up from the noise in the resonator but rather the amplifier is injection-seeded by the internally-generated Raman signal. The amplifier can be designed such that a Raman signal coincides with a particular whispering gallery mode of the resonator, which has the effect of amplifying a single mode. Thus, the Raman generation process and the frequencies of the whispering gallery modes ensure that only a single spectral line is emitted, and the amplifier discriminates against all other modes. Therefore, the energy stored under the amplifier gain profile is extracted predominantly in a single line if the gain medium is homogeneously-broadened. If producing two or more lines is advantageous for a particular application, this can also be engineered by choosing a resonator material with a Raman spectrum that has the requisite number of strong lines and are matched to modes available from a resonator of the proper dimensions. An amplifier of the invention, and networks of amplifiers and transmission media (such as additional resonators or microspheres without gain media), can selectively amplify a single (or a few) Raman line(s) produced within a resonator and can route narrowband optical power on a chip.

Operation of an amplifier consistent with FIG. 1A was demonstrated experimentally. The experimental devices also demonstrated additional preferred features of the invention. In the experiments, a hybrid optoplasmonic amplifier, injection-seeded by an internally-generated Raman signal and operating in the visible (563-675 nm) was demonstrated with evidence of amplification. The gain medium was tethered to a polystyrene microsphere whispering gallery mode resonator with a protein, and the resonator was placed upon a plasmonic surface situated on a Si substrate. The pump was a laser (632.8 or 532 nm) source. The gain medium included dye molecules that were tethered approximately 11 nm from the microresonator surface. The experiments also showed that placing the gain medium instead at the interface between the resonator and the plasmonic array produced no optical amplification of specific Raman lines, but instead a conventional, surface-enhanced Raman scattering (SERS) spectrum of the dye alone was generated.

Figure 1D:
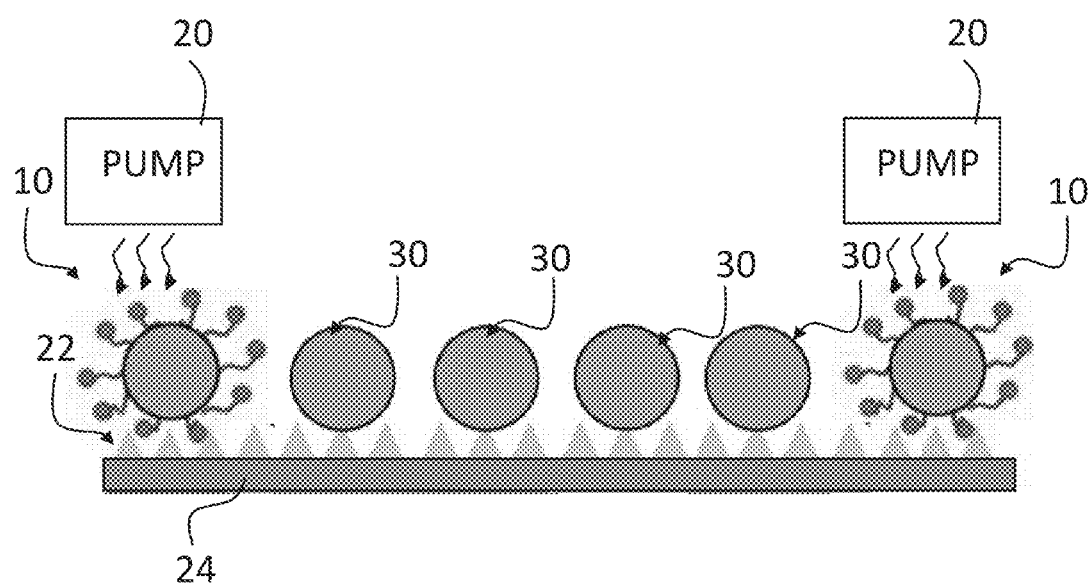
FIG. 1D is a schematic diagram of a preferred embodiment optical network.

FIG. 1D shows a preferred embodiment optical network. Amplifiers of the invention such as the preferred embodiment of FIG. 1A form the basis for optical networks. In the network of FIG. 1D, multiple whispering gallery mode resonators 30 act as a transmission medium between two amplifiers 10. The resonators 30 need not have a gain medium, but serve to transmit power generated by an optical amplifier. In another variation, WGM resonators 30 are also pumped optically, such as via additional pump sources, extension of the pumps 20, or optics that provide power from the pump sources 20. In this instance, the Raman seed signal will be produced within all of the resonators 30 that are irradiated by the pump source. This seed signal will augment, and is at the same frequency as, the optical signal received by the chain of resonators 30 from the optical amplifier 10. Furthermore, a small amount of optical gain can be provided by the WGM resonators 30 if a modest amount of the gain medium material (perhaps less than that applied to the amplifiers 10) is added to the surface of the WGM resonators 30. The resonators 30 must be within the evanescent field of adjacent resonators or the amplifiers. In an example where the evanescent field of an optically WGM resonator 30 extends approximately 200 nm beyond the surface of the resonator, the resonators 30 are placed within 200 nm of each other or the optical amplifiers 10.

Figure 1E:
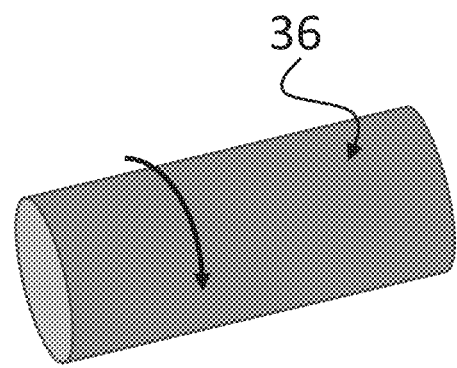
FIGS. 1E and 1F illustrate alternate resonators for amplifiers and optical networks of the invention.
Figure 1F:
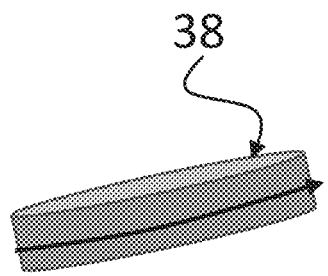

FIGS. 1E and 1F illustrate alternate resonators that can be used in the network of FIG. 1D as the resonators 30 or in amplifiers 10 such as shown in FIGS. 1A and 1n the network of FIG. 1D. FIG. 1E shows a rod-shaped resonator 36. As indicated, the whispering mode circulation will be circumferential (i.e., in a plane transverse to the axis of the rod). FIG. 1F shows a disk-shaped resonator 38. As in FIG. 1E, the mode circulation is circumferential. The gain media 14 can be attached as in FIG. 1A as the alternate shaped resonators can be substituted for the microsphere resonator 12 of FIG. 1A. As with other embodiments, the resonators of FIGS. 1E and 1F have diameters that are on the nanoscale or microscale, and can be made from polystyrene or other polymers, glass, etc.

The WGM resonators 30 can be the same size, shape and material of the resonator used in amplifier 10, but can also be a different size, shape or material. One or more of the WGM resonators 30 can, for example, be replaced by a spherical or cylindrical resonator fabricated from a nonlinear optical medium such as $LiNbO_3$ or KDP. Doing so allows for functionality such as modulation or second harmonic generation (SHG) to be incorporated into the optical transmission chain. If optical modulation is desired, microscale electrodes can be deposited onto the top and bottom of a sphere (or cylinder) fabricated from an SHG material.

Although the WGM resonators 30 are not likely to be identical due to manufacturing tolerances, power transmission along the chain will still occur despite the fact that the distribution of power among the azimuthal modes will change. That is, power will be transferred among azimuthal modes of different mode number (n) as power propagates down the chain. In practical terms, however, efficient power transmission will require strict limits on the variation in sphere (or cylinder) diameter or intentionally varying the sphere diameters such that the frequency of a given mode (n) in a specific sphere matches that for a different mode (n') in the next sphere. Preliminary experiments with chains of spheres, as long as eight spheres, demonstrate that the transmission of optical power does, indeed, occur and the efficiency of transmission is surprisingly high. Artisans will appreciate that complex patterns and extended networks can be formed, based upon the fabrication processes described in this application and the knowledge in the art.

The experiments will be discussed below. Artisans will understand that the invention is broader than the specific experimental devices.

Experimental and Simulation Section

To prepare the resonator, dye molecules conjugated with a protein (NeutrAvidin: NA) are coated onto biotinylated polystyrene microspheres having a diameter, d, of nominally 2 μm or 10.1 μm. Tethering of the dye to the surface of the sphere with the biotin-avidin protein positions the molecules 11.1±0.1 nm from the surface, thereby situating the dye well within the evanescent field of whispering gallery modes associated with power circulating within the spherical microresonator. A single sphere is then placed onto the surface of a non-patterned (irregular) plasmonic array structure comprising an 80 nm thick silver film deposited onto an aperiodic array of Si nanocones. Plasmonic surfaces having periodic nanostructures are used in other embodiments and actually appear to be superior in performance.

The plasmonic array was produced by photolithography and a reactive ion etching process on a 4-inch (10 cm) diameter wafer. First, the area where nanocone structures are to be etched is patterned by photolithography. Secondly, in a mixture of HBr and $O_2$ gases, the silicon substrate is etched by HBr and oxidized by $O_2$ simultaneously. The nanocone structures are synthesized by taking advantage of the high etching selectivity of HBr for silicon, relative to its oxide (200:1). Finally, a thin (80 nm) silver coating is evaporated onto the Si nanocone array.

The biotinylated polystyrene microspheres were obtained from Bangs Laboratories Inc. and dye (NeutrAvidin Dylight 650 (NA-Dy), 1 mg/mL) was purchased from Thermo Scientific. Five hundred microliters of NA-Dy solution (100 μg/mL) were prepared with PBS buffer and 50 μL of microspheres in storage buffer (100 mM Borate, pH 8.5+ 0.01% BSA+0.05% Tween® 20+10 mM EDTA+≤0.1% $NaN_3$) was mixed with the NA-Dy solution in a 1:10 ratio. The mixture was incubated on a shaker for 30 minutes (or 0.5-2 hrs, depending on the concentration) and covered by aluminum foil. Subsequently, the solution was centrifuged at 3000 rpm for 2 min and re-suspended with the buffer using a vortex mixer. The procedure was repeated 4 times. Finally, a 1 μL drop from the solution was cast onto the glass/plasmonic substrate for further experimentation.

The concentration of protein (NA) in the sample was measured with a NanoDrop ND-1000 spectrophotometer (Nano Drop Technologies, Rockland, Del., USA) by using the absorbance value at 280 and 650 nm ($A_{280}$ and $A_{650}$). The protein concentration was determined from the expression: Protein concentration, $M=[A_{280}-CF\times A_{650}]\times$dilution factor/$\in$, where $\in$ is the molar extinction coefficient of the protein, and CF is the correction factor for the dye's contribution to $A_{280}$. The degree of labeling, DOL, (moles of dye per mole of protein) was calculated as: $DOL=A_{650}\times$ dilution factor/($\in'\times$protein concentration(M)), where $\in'$ is the molar extinction coefficient for the fluorescent dye.

Whispering gallery modes inside the spherical microresonator were simulated by COMSOL. As the geometry of the resonator is axisymmetric, a two-dimensional representation model was employed. Oxborrow lists the system of differential equations for simulating whispering gallery modes (see, Oxborrow, M. Traceable 2D finite-element simulation of the whispering-gallery modes of axisymmetric electromagnetic resonators. *IEEE Trans. Microw. Theory Tech.* 55, 1209-1218 (2007)) and, with COMSOL, a mesh was generated and the resonant frequency of the optical mode near the specified mode number was calculated. In order to determine the power enhancement produced by the amplifiers, a three dimensional finite-difference time-domain (FDTD) method was implemented with software from Lumerical Solutions, Inc. An electric dipole source was placed 100 nm above a 10.1 μm diameter polystyrene sphere. The polarization of the dipole was oriented along the y-axis of FIG. 1, and the emitter was assumed to emit a fluorescence spectrum peaking at 676 nm and having a spectral width (FWHM) of 70 nm. For the sake of simplicity, the plasmonic array underlying the spherical resonator was assumed to be a periodic, 5×5 array of nanocones with a periodicity of 120 nm. The electric field distribution over the entire structure was calculated with a mesh size of 1 nm.

Figure 2:
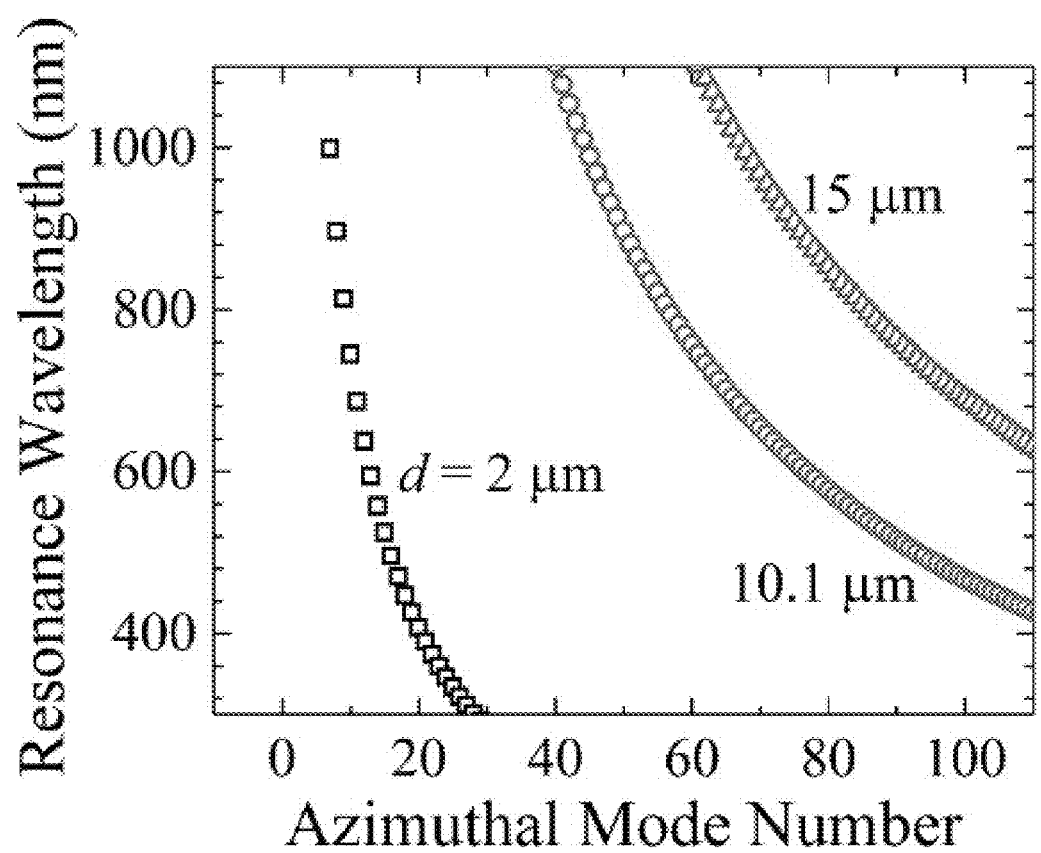
FIG. 2 plots the calculated dependence of the eigenmode resonance wavelength on the azimuthal mode number (m) for microsphere resonators having diameters of 2, 10.1, and 15 μm.
Figure 3A:
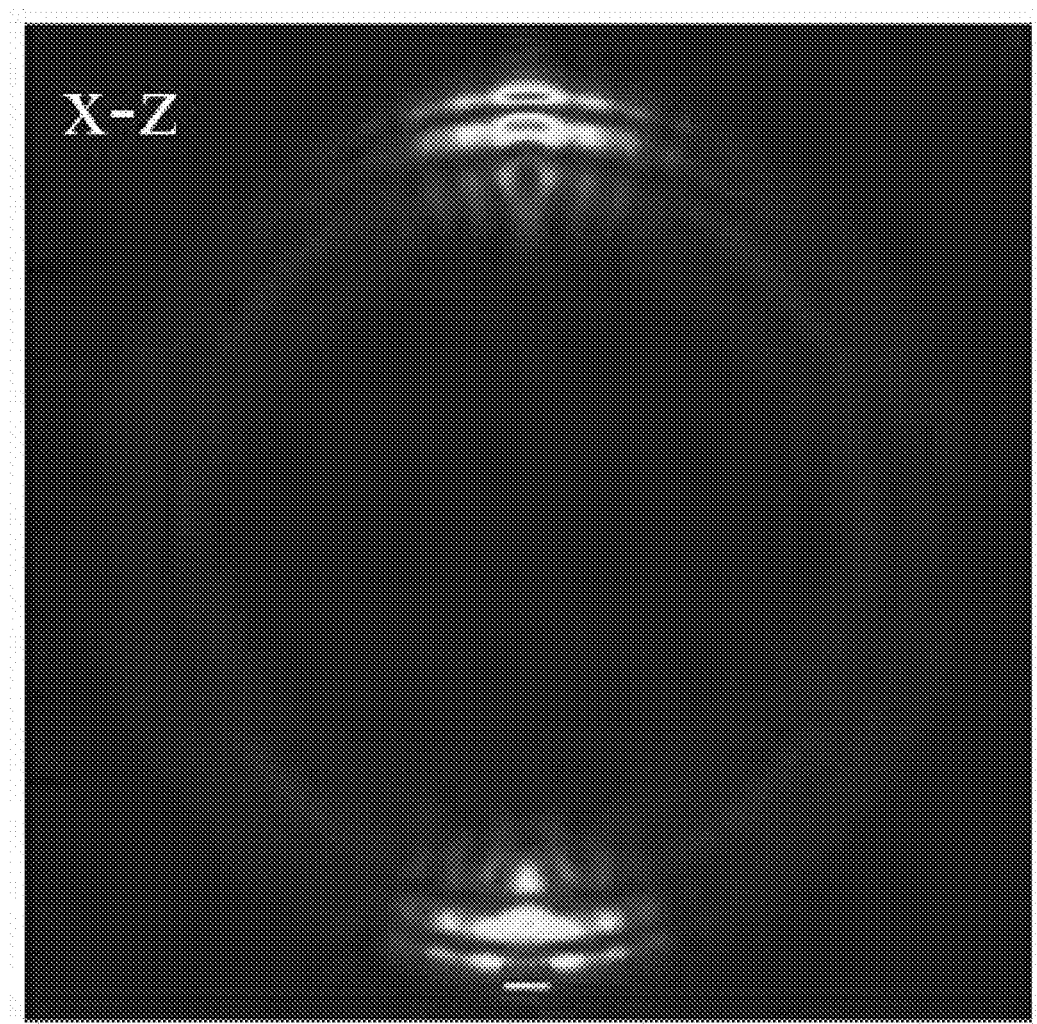
FIGS. 3A (x-z plane) and 3B (y-z plane) are shade-coded images illustrating the squared magnitude of the local electric field calculated by a finite-difference time domain algorithm for a spherical microresonator.
Figure 3B:
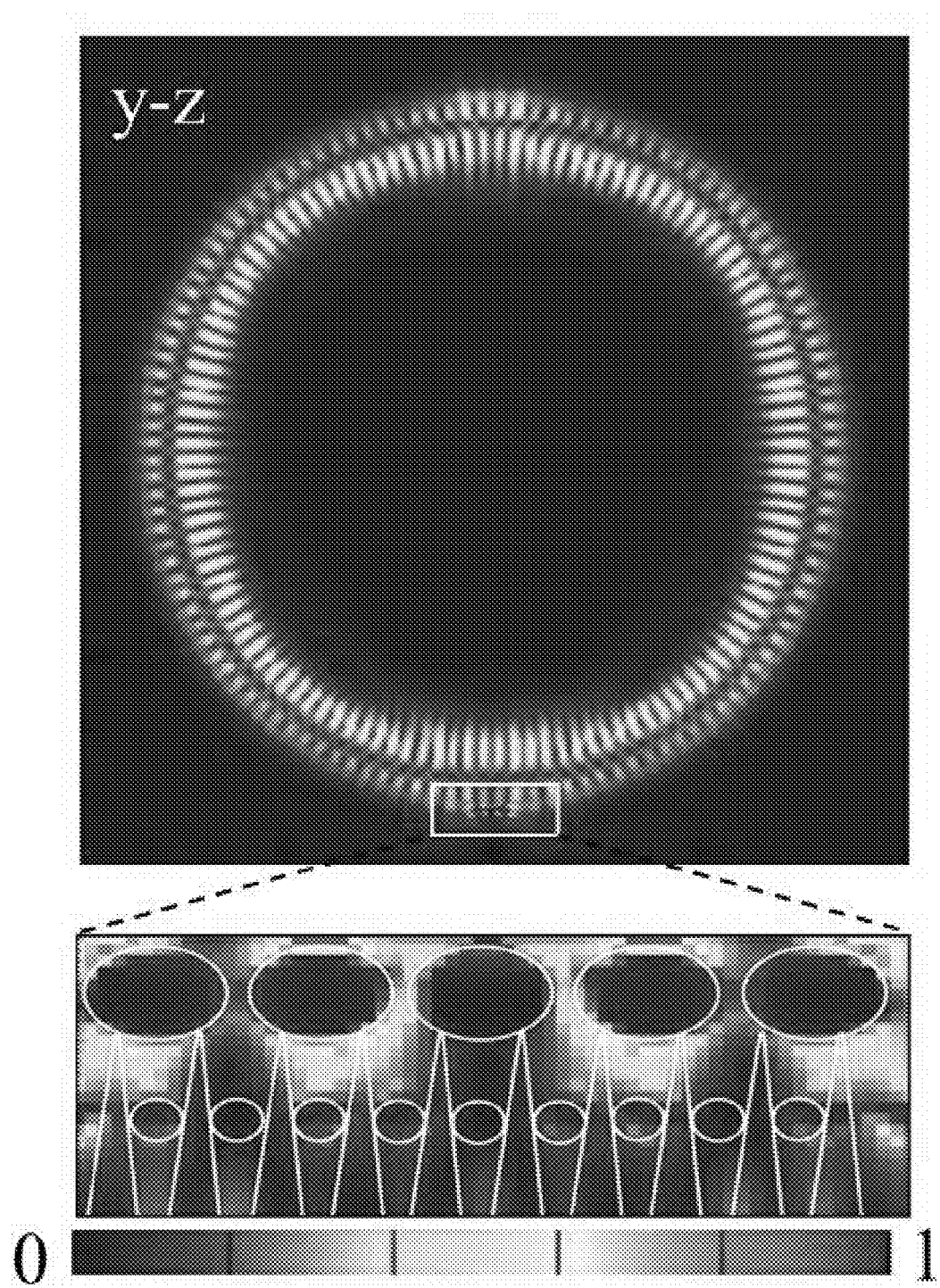

FIG. 2 shows the calculated dependence of the eigenmode resonance wavelength on the azimuthal mode number (m) for microspheres having diameters of 2, 10.1, and 15 μm. Note that the free spectral range (FSR) for the three microresonators in the λ~650 nm region is 42.6 nm, 9.5 nm, and 6.3 nm for d=2, 10.1, and 15 μm, respectively. FIGS. 3A and 3B are shade-coded images illustrating the squared magnitude of the local electric field ($|\vec{E}|^2$), calculated by an FDTD algorithm for a spherical microresonator and assuming d and m to be 10.1 μm and 68 (λ~676 nm), respectively. The calculations were based on a single dipole (molecule) situated 100 nm from the polystyrene microsphere surface, and the dipole polarization is oriented along the y axis of FIG. 1. In FIG. 3A, the mode pattern is viewed along an axis (x) orthogonal to the y-z plane in which the spatially-averaged mode intensity is maximum. Observing the same intensity distribution in the y-z plane itself results in the map of FIG. 3B. A magnified view of the field intensity extending from the microresonator into the underlying plasmonic array structure is shown in FIG. 3B. As expected, the electric field strength is greatest at the spherical resonator/plasmonic surface interface and the region between the silver-coated nanocones.

Figure 4:
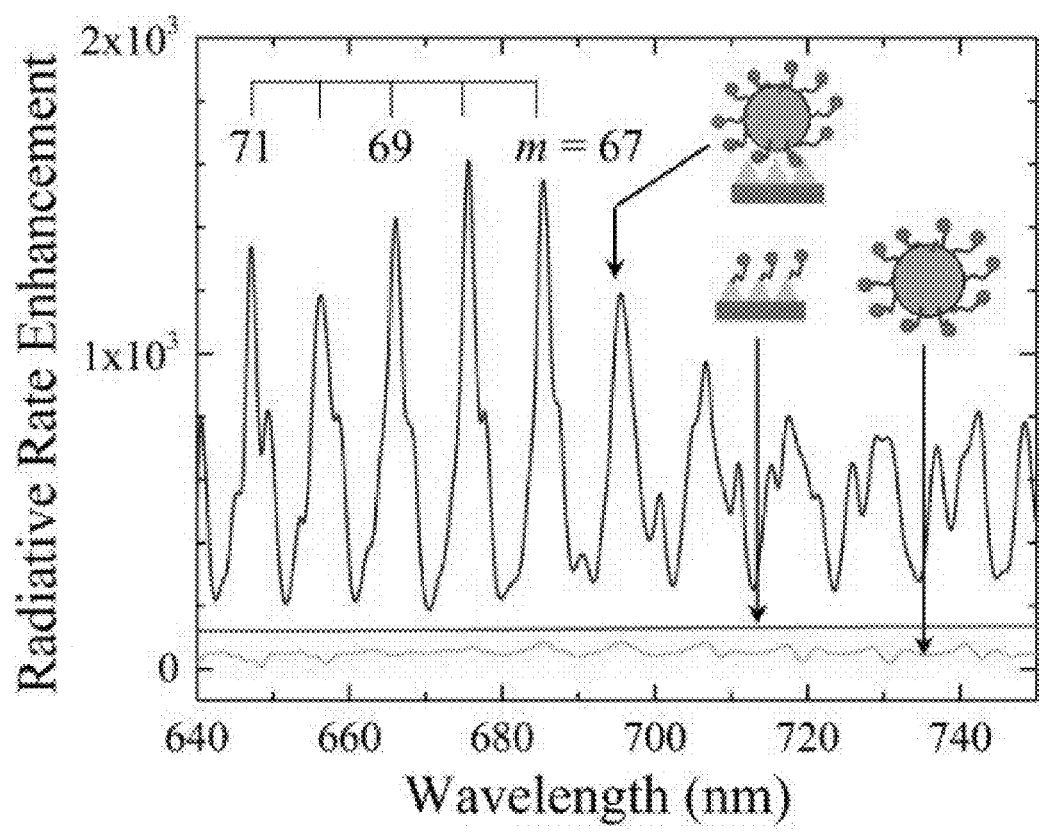
FIG. 4 graphs calculations of the enhancement of the dye radiative rate, relative to that for the dye on a flat surface, for various combinations of the three components of the amplifier of FIG. 1.

FIG. 4 graphs calculations of the enhancement of the dye radiative rate, relative to that for the dye on a flat surface, for various combinations of the three components of the amplifier of FIG. 1. Ignoring for the moment the influence of an optical signal injected into the microresonator, the full optoplasmonic amplifier (dye, spherical resonator, and plasmonic array-top curve) yields calculated radiative rates three orders of magnitude larger than those for the dye alone. Peak enhancements are observed at the WGM resonance wavelengths, and the spectral widths (FWHM) of 2 nm for the m=69-72 modes indicate that the expected value of Q for the microresonator alone is at least 300. Enhancement of the dye radiation rate falls precipitously when the plasmonic array is removed from the amplifier (leaving only dye molecules tethered to the microsphere resonator-lower line). Similarly, if the resonator is removed and the dye is positioned 30 nm above the surface of the plasmonic array, peak enhancements of ~80 in the radiative rate are observed (flat line). Artisans will appreciate that the relative contributions of the resonator and plasmonic array to the overall dye emission intensity are of secondary importance, since different design parameters (d, plasmonic array structure) are capable of reversing the relative magnitudes of their respective enhancements. Rather, as illustrated by FIG. 4, the combined action of the three amplifier components produces radiative enhancements 2-3 orders of magnitude larger than those offered by the plasmonic array or the resonator alone.

Figure 5A:
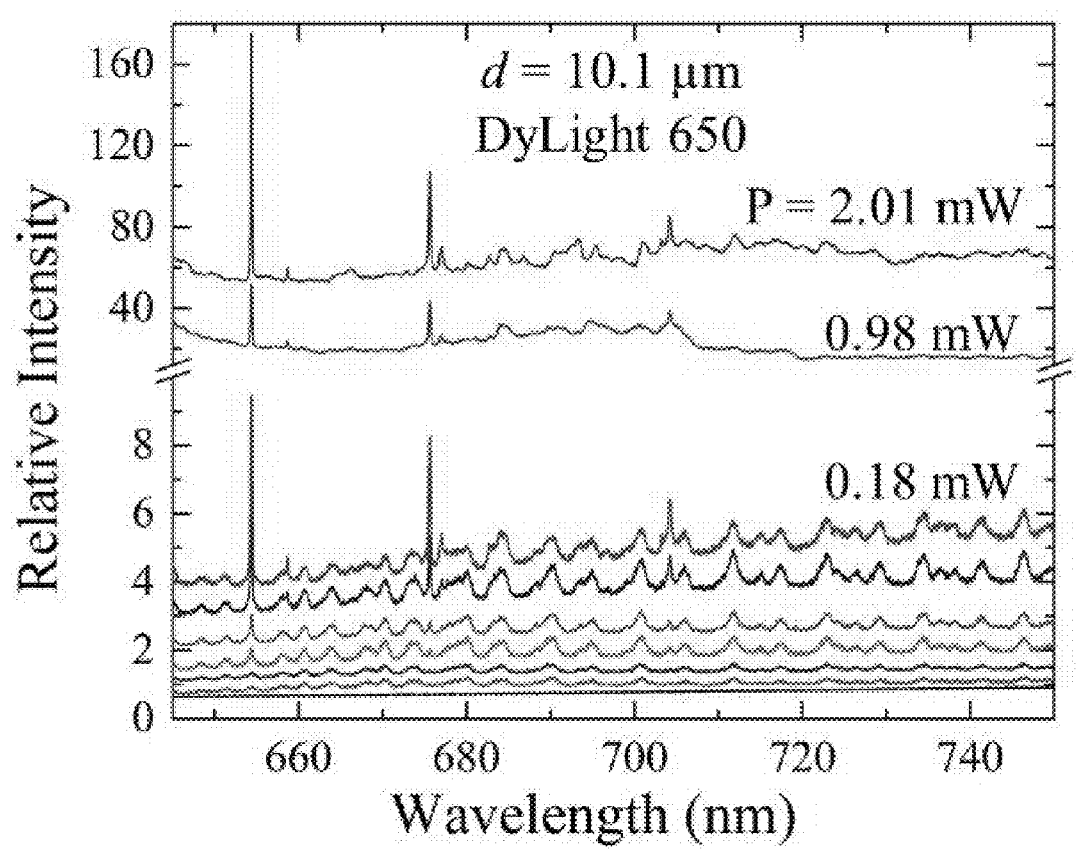
FIGS. 5A-5D illustrate spectra from the injection-seeding of experimental amplifiers having d=10.1 μm or 2 μm whispering gallery mode resonators.
Figure 5B:
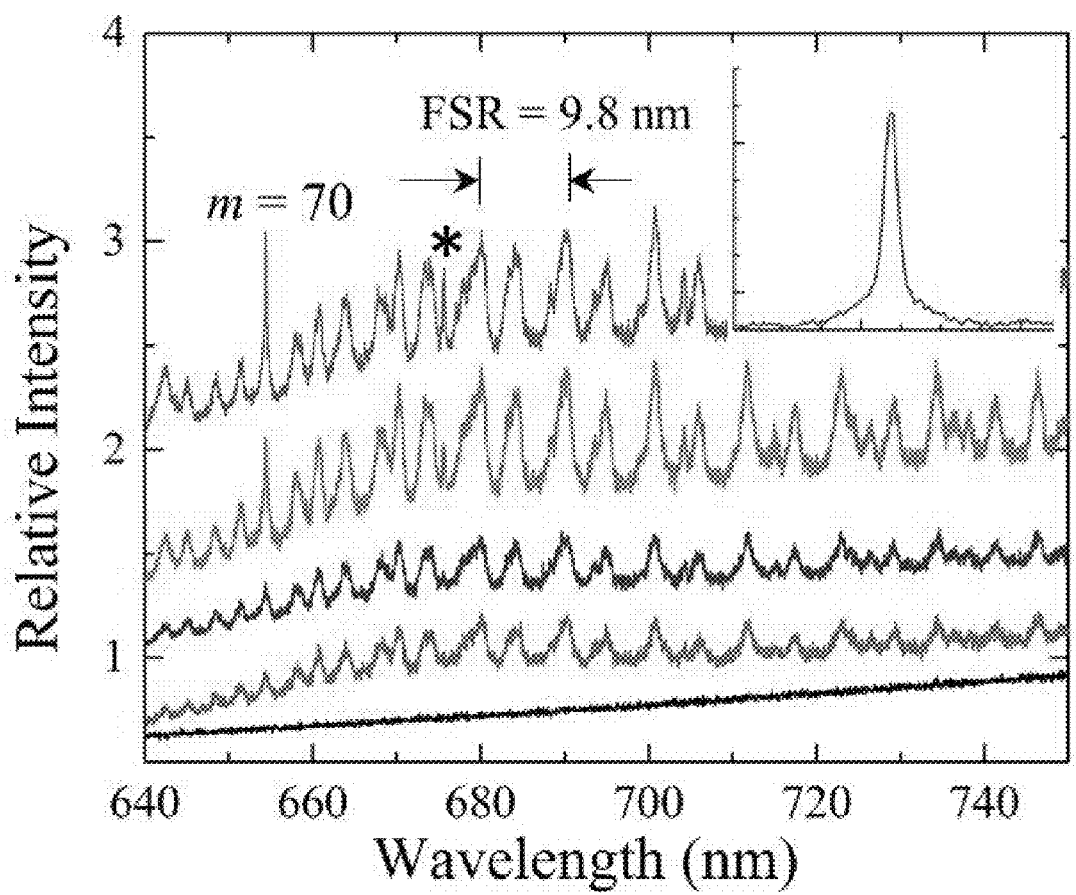
Figure 5C:
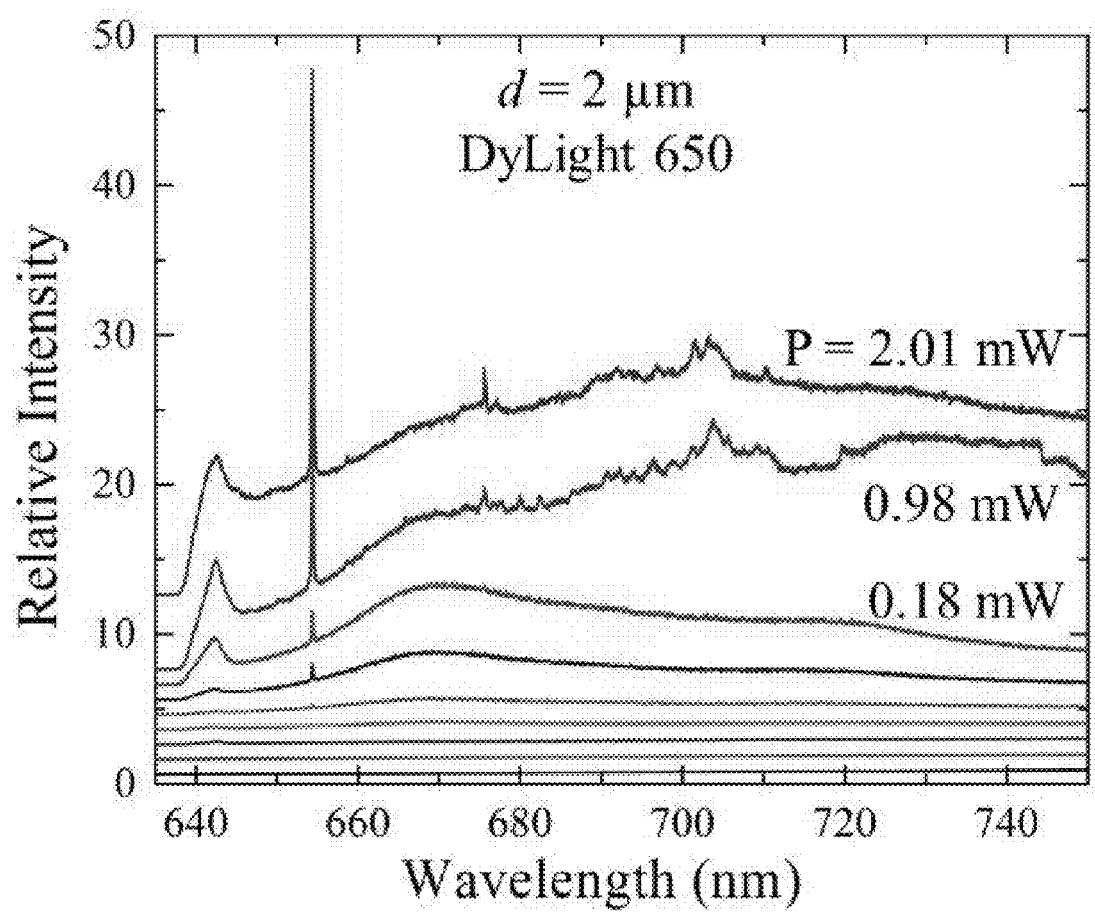
Figure 5D:
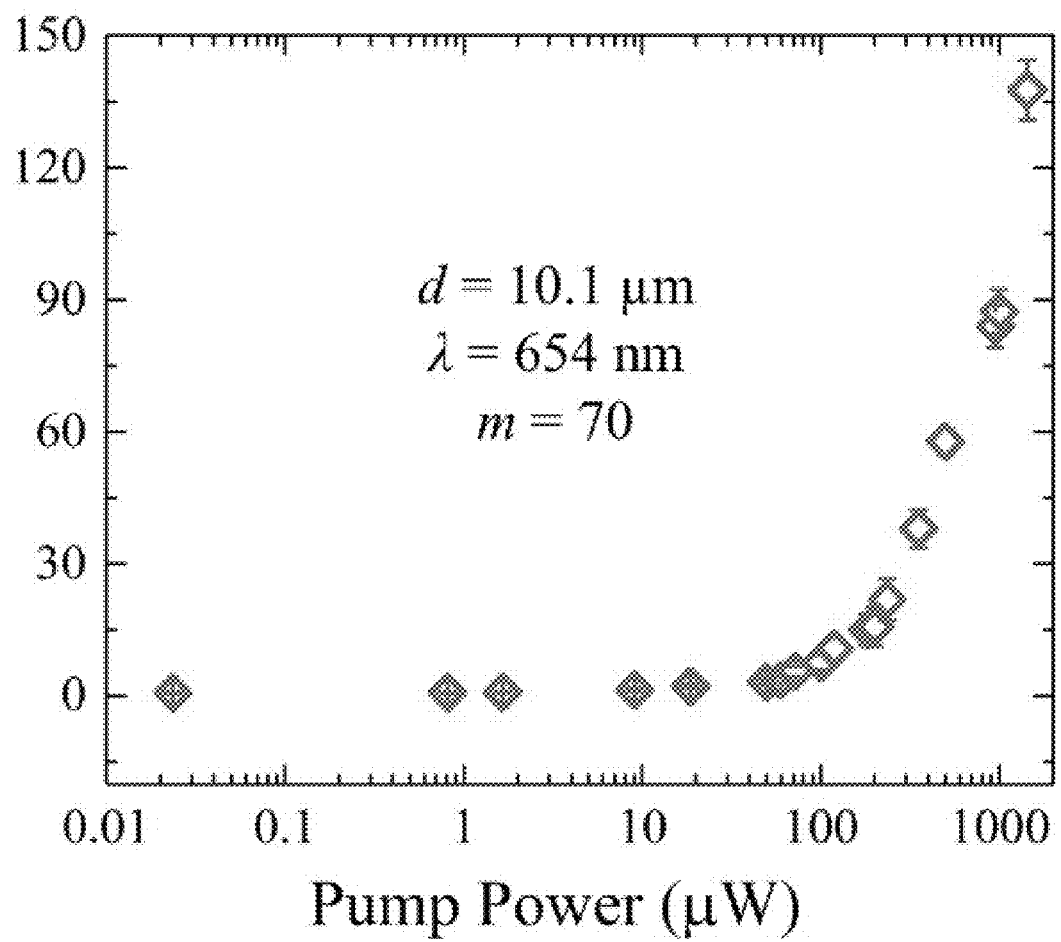

Irradiating the optoplasmonic structure of FIG. 1 with the focused beam of a CW He—Ne laser (632.8 nm) results in the photoluminescence spectra of FIG. 5A-5D. FIGS. 5A-5D illustrate spectra recorded when testing the injection-seeded amplifiers. FIG. 5A provides photoluminescence (PL) spectra in the 650-750 nm region for an amplifier incorporating a d=10.1 μm resonator to which Dylight 650 dye is conjugated. Nine spectral scans, recorded for λ=632.8 nm pump powers ranging from 24 nW to 2.0 mW, are given, and for clarity, are displaced vertically from one another. There is a change in the scale of the ordinate for the two uppermost spectra. FIG. 5B is a magnified view of the top five spectra from FIG. 5A. The rate of growth of the 654.3 nm line (~520 cm$^{-1}$ Raman mode) intensity outpaces that for the polystyrene lines that do not lie on a whispering gallery mode peak. This shows that the coincidence of a particular Raman mode of avidin (or Si) with a specific whispering gallery mode of the spherical resonator results in the amplification of the seed radiation at this frequency, to the exclusion of other Raman lines and microresonator modes. The near collapse of the whispering gallery mode in FIG. 5A, as the pump power is increased, is consistent with the behavior of other injection-seeded amplifiers. Specifically, a signal injected into the amplifier will extract energy stored under the gain profile, provided that the gain medium is homogeneously-broadened (which is known to be the case for the dyes employed in the experiments) and the injection seed wavelength is matched to the dye gain spectrum. This explains the reason why the whispering gallery mode structure does not intensify at the higher pump powers. Instead, the whispering gallery mode spectrum diminishes quickly in intensity with increasing pump power, and the broadband fluorescence characteristic of the dye is not observed—the seed appears to be extracting optical power that is emitted elsewhere in the spectrum when the pump intensity is lower. FIGS. 5C and 5D present data concerning results similar to those of FIGS. 5A and 5B. The additional data were acquired with an amplifier of the invention that utilized a d=2 μm microresonator and Dylight 650 dye attached to the resonator. The selective amplification of the 654 nm Raman line is evident, and the laser excitation powers (λ=632.8 nm) again range from 24 nW to 2 mW. The broad continuum at ~642 nm and the structure near 702 nm are due to the Ag nanolayer. FIG. 5D illustrates the relative intensity of the 654 nm output with the 632.8 nm excitation power for a d=10 μm microresonator.

Data are presented for nine values of laser power (P), ranging from 24 nW to 2.0 mW, and with DyLight 650 dye (MW=1357) tethered to a 10.1 μm diameter polystyrene sphere by biotin-NA. For the lower values of excitation power (P<1 mW), the whispering gallery mode structure is clearly present but spectrally-narrow features are also observed, the most intense of which lie at 654.3 and 675.7 nm Indeed, as the laser excitation power is increased, the undulations due to the whispering gallery modes diminish in intensity and the spectra are dominated by these two narrow lines. Measurements of the linewidths of these features show them to be below the instrument (spectrometer) spectral resolution of 5×10$^{-3}$ nm. Magnifying the five spectra of FIG. 5A that were recorded at the lowest laser power levels (denoted by the dashed rectangular box) reveals that the line at 654.3 nm lies atop the peak of the m=70 mode of the 10.1 μm diameter sphere, and is considerably narrower than the mode profile. The inset to FIG. 5B provides a further expanded view of the m=70 WGM and the superimposed, narrow line. In contrast to the emission at 654 nm, the 675.7 nm feature (identified by the asterisk in FIG. 5B) lies between two WGM maxima. Artisans will recognize that the observed FSR for the microresonator (9.8 nm at 680 nm) is in agreement with the calculated value (FIG. 2) of 9.5 nm for λ=650 nm. When the microsphere diameter is reduced to 2 μm, the dominance of one (or a few) intense features is more dramatic than that observed for the larger resonator. As illustrated by the spectra of FIG. 3, which were acquired with the dye DyLight 650 attached to the polystyrene microsphere, the line at 654 nm dwarfs all of the discrete structures in the 638-750 nm spectral region.

Figure 6A:
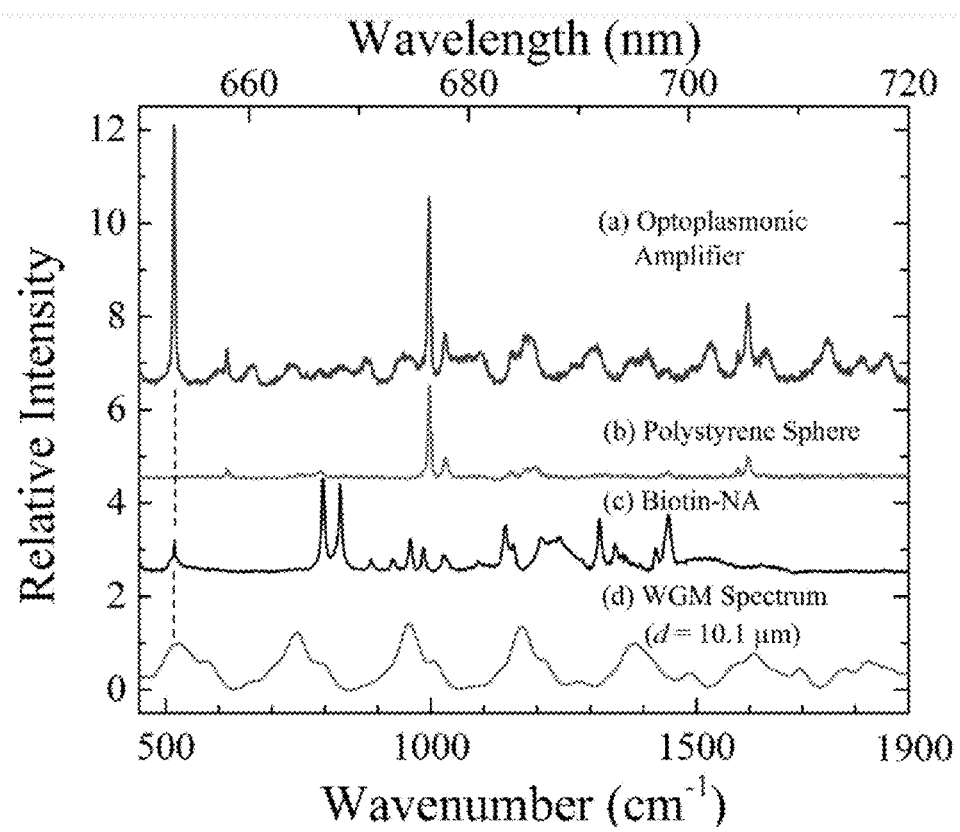
FIG. 6A illustrates photoluminescence data comparing Raman and whispering gallery mode spectra for an injection-seeded amplifier of the invention.
Figure 6B:
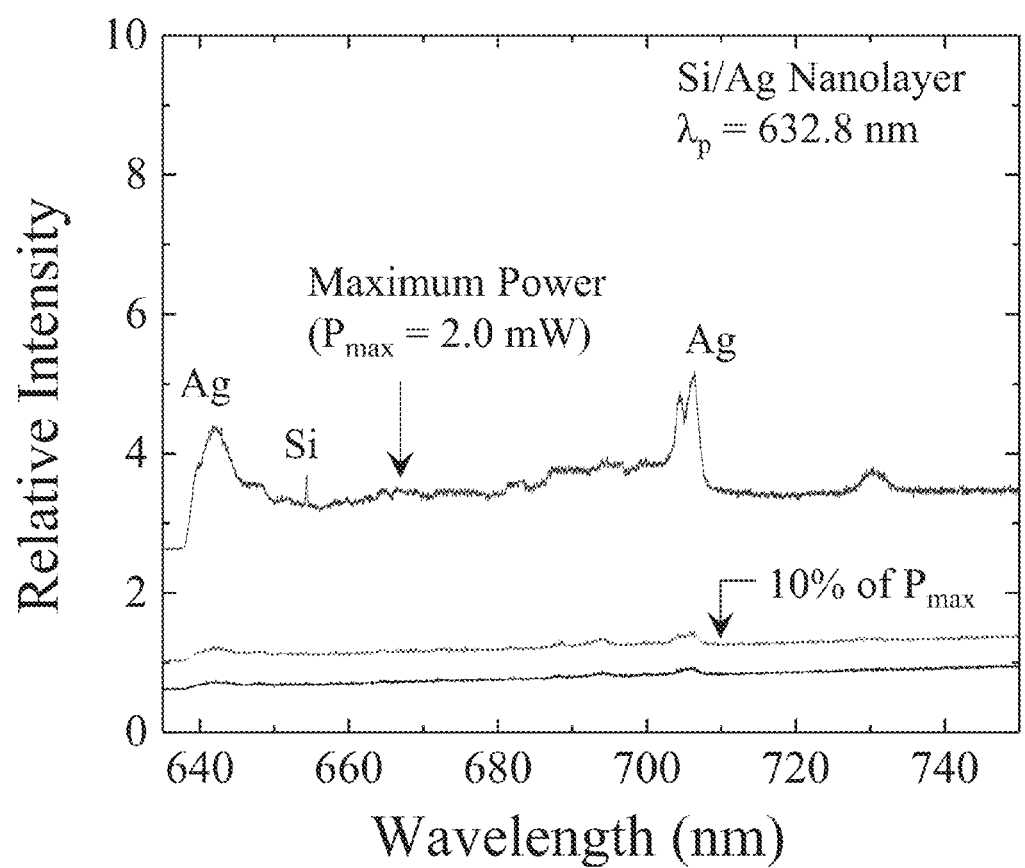
FIG. 6B show photoluminescence spectra in the 635-750 nm region, obtained by irradiating an experimental plasmonic array alone, to characterize one component of a preferred embodiment amplifier.

The origin of the narrow lines of FIGS. 2-5D becomes apparent in FIG. 6 where the output spectrum for the optoplasmonic amplifier is compared with the Raman spectra recorded for the microsphere resonator and (separately) biotin-avidin. FIG. 6A compares Raman and whispering gallery mode spectra. The output spectrum of the amplifier was obtained for 182 μW of laser excitation power at 632.8 nm. The Raman spectrum between 500 cm$^{-1}$ and 1900 cm$^{-1}$ for the microresonator alone (polystyrene sphere) is shown. The Raman spectrum for the Biotin-NA complex over the same spectral range is also illustrated. The spectrum (TE modes) for a d=10.1 μm sphere is also shown. The dashed vertical line illustrates the coincidence of the 520 cm$^{-1}$ Raman mode with a local maximum (resonance) in the whispering gallery mode spectrum. FIG. 6B shows photoluminescence spectra in the 635-750 nm region, obtained by irradiating the Si nanocone/Ag nanolayer (~80 nm in thickness) structure alone. The 521 cm$^{-1}$ Raman mode of Si is noticeable at the highest laser ($\lambda_p$=632.8 nm) power available and the spectra presented here have been displaced vertically for clarity.

In FIGS. 6A and 6B, wavelength is expressed on the lower abscissa in terms of the red-shift with respect to the laser excitation frequency ($\lambda$=632.8 nm, $\tilde{v}$=15,798.02 cm$^{-1}$). FDTD calculations of the whispering gallery mode spectrum for a d=10.1 µm polystyrene sphere in the 655-720 nm region are also given. Sharp lines are apparent in FIGS. 5A-5B at 654.3, 675.7, and 704.2 nm. The latter two are matched precisely by the strongest Raman lines (1$^{st}$ Stokes) of polystyrene. The dominant Raman mode in the polystyrene spectrum at 1002 cm$^{-1}$ (FIG. 6A) was first reported by Cornell and Koenig in 1968. The prominence of the polystyrene Raman lines in the amplifier output spectrum is the result of two factors. The first is that generation of Raman radiation at 1002 cm$^{-1}$ and 1602.7 cm$^{-1}$ occurs throughout the sphere, and the scattered radiation is largely confined to the sphere by internal reflection, owing to the polystyrene refractive index of 1.58. The second consideration is that the fluorescence spectrum for the dye tethered to the sphere (Dylight 650) peaks at ~680 nm, and maximum optical gain is expected to occur in the 680-690 nm interval (red-shifted from peak fluorescence by absorptive losses). Consequently, the polystyrene Raman lines are amplified by the dye as the evanescent field associated with optical power circulating in the microsphere extracts energy from the dye molecules that are optically-excited by the incident laser radiation.

The FIG. 6B spectra presented demonstrate that the continuum at $\lambda$~642 nm and the structure in the vicinity of 702 nm arise from the Ag nanolayer. Measurements of the variation of the relative intensity at 654 nm with the laser excitation power, summarized in FIG. 5D, show a rapid rise in the detected signal (at $\lambda$=654 nm) for a 10.1 µm diameter sphere and incident powers above 100 µW.

Gain profiles for dyes such as Dylight 650 are known to be homogeneously-broadened and, therefore, injection-seeding of the gain profile with a narrow-band input signal (such as that provided by Raman scattering), will result in the efficient extraction, by that narrowband seed, of energy stored in the electronic excited states of the dye.

Figure 7A:
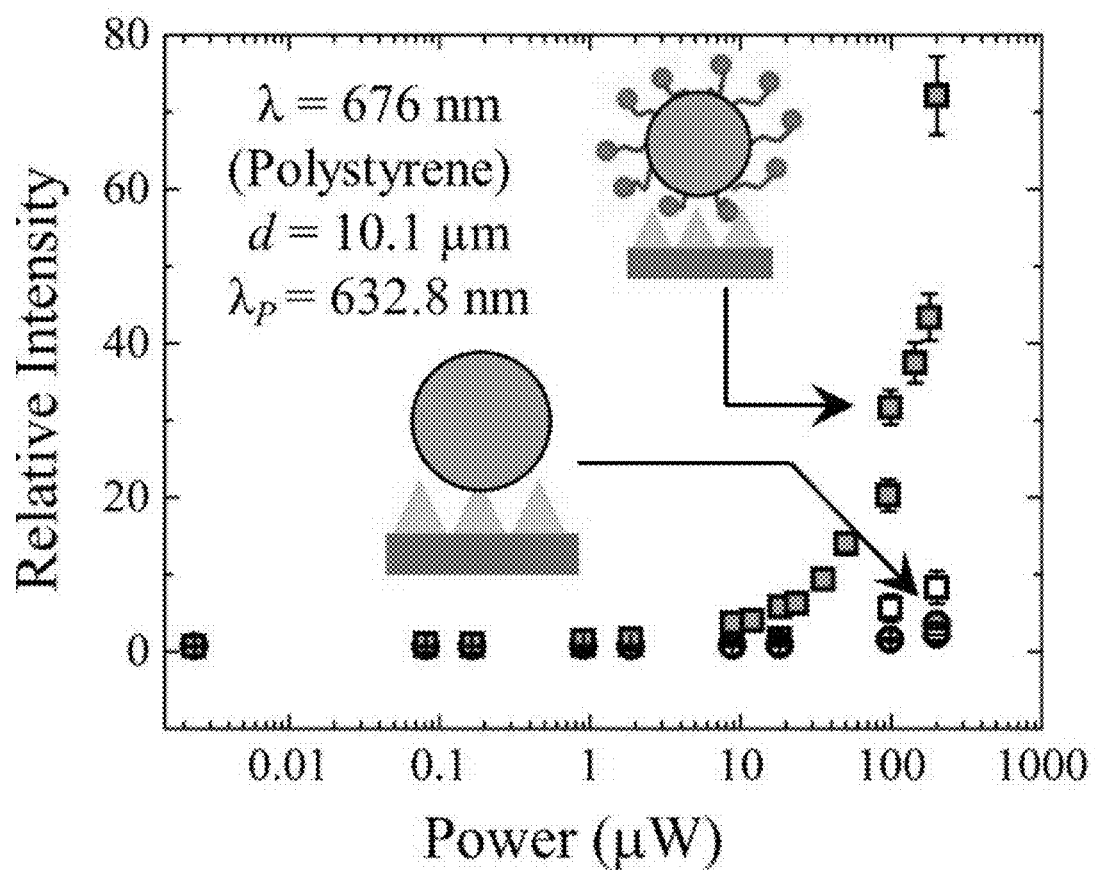
FIGS. 7A and 7B illustrate photoexcitation data relating to amplification of Raman seed radiation via overlap with the gain medium spectrum.
Figure 7B:
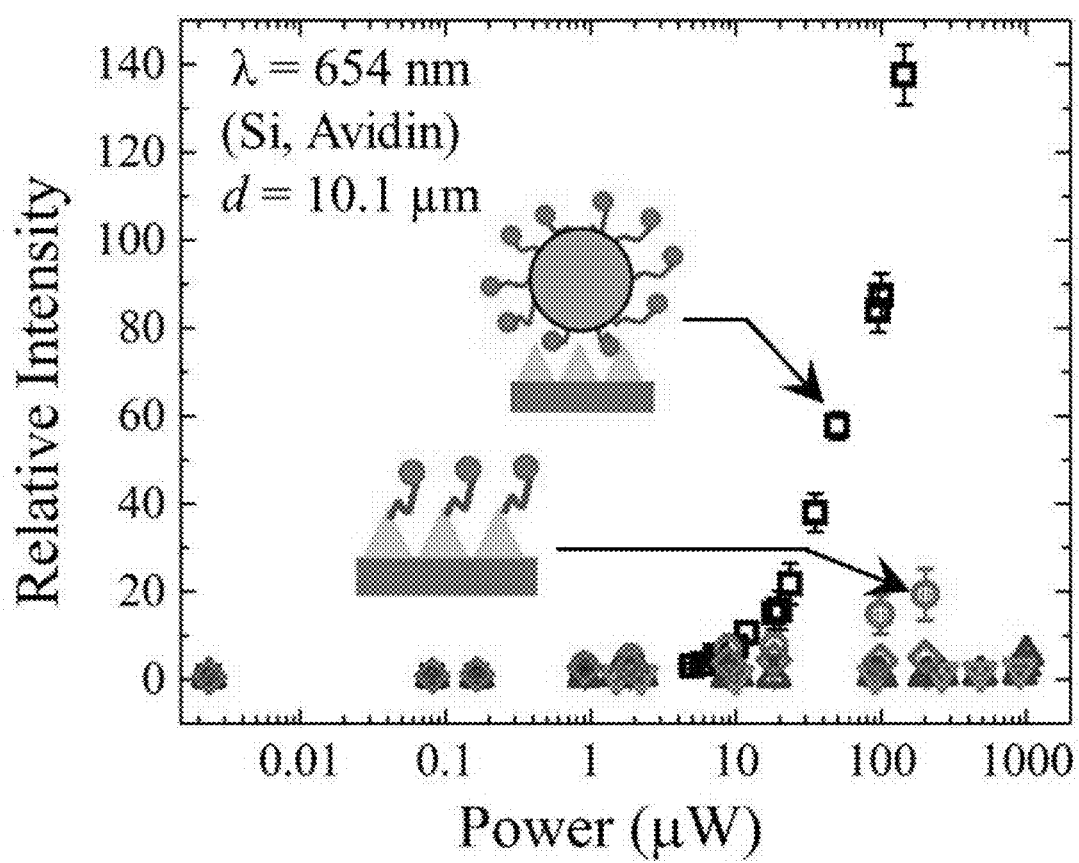

FIGS. 7A and 7B illustrate amplification of Raman seed radiation. The role of the dye in the amplification of the 1002 cm$^{-1}$ and 1602.7 cm$^{-1}$ Raman mode emission of polystyrene is confirmed by experiments that produced the FIGS. 7A and 7B data in which the radiative output of the amplifier is monitored with and without dye tethered to the microresonator. The FIG. 7A data show amplification of Raman seed radiation at 675.7 nm ($\lambda_{pump}$=632.8 nm; Raman mode of polystyrene at 1002 cm') with the full dye/resonator/plasmonic array system (■) and various combinations of the three components. The open squares (□) represent data obtained with the plasmonic surface and the microresonator but with the dye removed from the resonator surface. All error bars represent uncertainties of ±1σ in the measurements. The circular data points denote data obtained with the microresonator with dye (•), and the microresonator alone (○). The FIG. 7B data are similar to those of FIG. 7A, but were obtained for the $\lambda$=654 nm Raman line of biotin (or Si). Results associated with the dye alone, dye tethered to the microsphere, and the microsphere (without dye) on the plasmonic array are represented by the diamond (◇), triangular (△), and inverted triangular (▽) symbols, respectively. Error bars again denote an uncertainty of one standard deviation.

FIG. 7A summarizes measurements of the relative intensity of the 675.7 nm Raman line for several values of the laser excitation power. Removing the dye from the microresonator results in a greater than one order of magnitude drop in the output intensity at this wavelength. This supports the conclusion that the mechanism responsible for the observed amplification is injection-seeding of the dye gain profile. This process is quite distinct from those giving rise to Raman scattering enhancements in microdroplets (See, Lin, H. & Campillo, A. Microcavity enhanced Raman gain. *Opt. Commun.* 133, 287-292 (1997)). It is also different from Raman lasers in microspheres (Spillane, S. M., Kippenberg, T. J. & Vahala, K. J. Ultralow-threshold Raman laser using a spherical dielectric microcavity. *Nature* 415, 621-623 (2002)) and from Raman-injected quantum cascade lasers (Troccoli, M. et al. Raman injection laser. *Nature* 433, 845-848 (2005)). An amplifier of the invention relies upon the interaction of the plasmonic array, the whispering gallery mode resonator, and the gain medium.

Artisans will also observe from the data that, at the highest laser pump powers available for the experiments, degradation of the dye gain medium was observed. Nevertheless, short exposures of the amplifier to the pump beam yield reliable spectra and several whispering gallery modes are clearly present even in the P=2.0 mW spectrum of FIG. 5A. In the interest of caution, however, the discussion to follow will emphasize spectra acquired for CW pump powers below 1 mW.

It is also notable that the dominant line at 520 cm$^{-1}$ in FIG. 6 coincides with a weak feature in the Biotin-NA spectrum. Well known from Raman spectroscopy of the biotin-avidin complex with both laser and incoherent sources, this frequency is associated with the S-S stretching mode for the sole disulfide unit in avidin. As indicated by the dashed vertical line in FIG. 6, the position of the 520 cm$^{-1}$ Raman mode of Biotin-NA also matches closely (for a driving wavelength of 632.8 nm) the peak of the m=70 WGM profile. Virtually all of the other biotin-avidin Raman features fall between WGM resonances. An alternative assignment for the 654.3 nm feature of FIGS. 5A and 5C is the well-known 521 cm$^{-1}$ Raman mode of Si. Although the nanostructured Si substrate is covered by an Ag nanolayer, weak Raman scattering is observed from the overcoated Si substrate at 654.3 nm when the laser excitation power is at its highest level. Other data showed faint emission observed from an Ag/Si nanocone substrate alone. The close coincidence between the frequencies of the avidin and Si Raman modes, in combination with the wavelength calibration process and the dispersion of the spectrograph available for these experiments, precludes a definitive identification of the 654.3 nm line of FIGS. 5A-6. Regardless of the source, however, the seed emission is quite weak and the match between the injected Raman signal and the peak of the m=70 whispering gallery mode leads one to expect the microresonator to have the greatest impact on the amplifier output at the wavelength of 654.3 nm. This is supported by FIG. 7B which compares the relative intensity of the 654.3 nm output signal recorded for the full amplifier (denoted by the open square symbols) with that produced by other component combinations. In particular, removing the microresonator and attaching the dye directly to the plasmonic surface (represented by open circles in FIG. 7B) again reduces the amplifier output intensity by more than an order of magnitude when the laser excitation (pump) power is 100 µW. Consequently, the plasmonic contribution to the overall output intensity of the amplifier is greater in this case than that of the resonator (i.e., the resonator and dye alone in FIG.

7B yield comparatively low output), but neither the nanoplasmonic array nor the microresonator separately (although coupled to the gain medium) approach the performance of the full amplifier.

Figure 8:
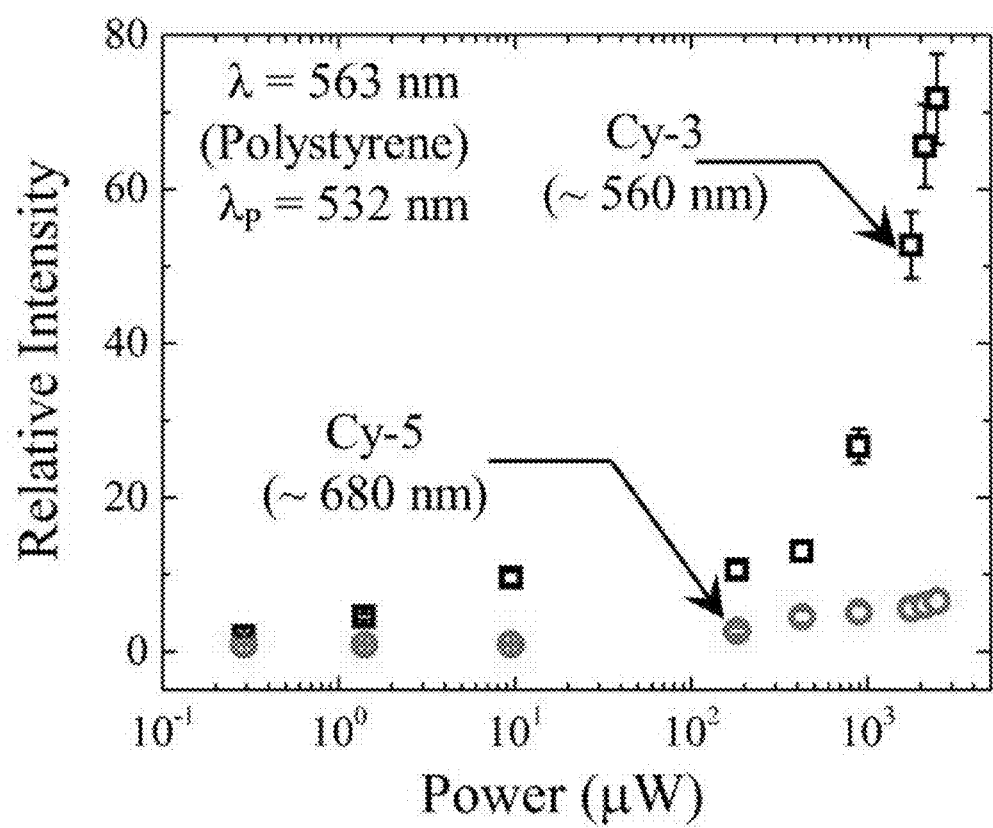
FIG. 8 illustrates additional photoexcitation data similar to those in FIGS. 7A and 7B, illustrating the requirement for an overlap of the dye gain spectrum with a Raman line of interest for both green (Cy-3) and red (Cy-5) dyes as gain media.

FIG. 8 includes photoexcitation data similar to those in FIGS. 7A and 7B, illustrating the requirement for an overlap of the dye gain spectrum with a Raman line of interest. In obtaining these data, the laser excitation wavelength was 532 nm and the relative intensity of the polystyrene Raman line at 563 nm was recorded. Results are shown for both green (Cy-3) and red (Cy-5) dyes. Error bars again represent an uncertainty of one standard deviation in the measurements.

The results of FIG. 8 confirm the results described previously, and demonstrate the substitution of green dye (Cy-3) for the red (Cy-5). The amplifier was pumped with the second harmonic of an Nd:YAG laser ($\lambda$=532 nm) The data show that when the amplifier is irradiated at 532 nm, the 1002 cm$^{-1}$ Raman line of polystyrene lies at 563 nm and strong amplification is observed for the Cy-3 dye but not for the red Cy-5 dye. This shows that the spectrum of the gain medium (with a peak at $\lambda$=560 nm) coincides with the Raman line of interest. However, substituting the red dye Cy-5 for Cy-3 in these experiments yields a null result, thus affirming the requirement that operation of the amplifier and realizing maximum amplification, in particular, is dependent upon matching the wavelength of the internally-generated Raman signal with the gain spectrum of the dye or other gain medium. Artisans will appreciate that the amplification process demonstrated in two regions of the visible confirms the versatility of the design. Selection of appropriate resonator and gain medium can produce outputs through a wide range of wavelengths, including the ultraviolet and near-infrared.

Figure 9A:
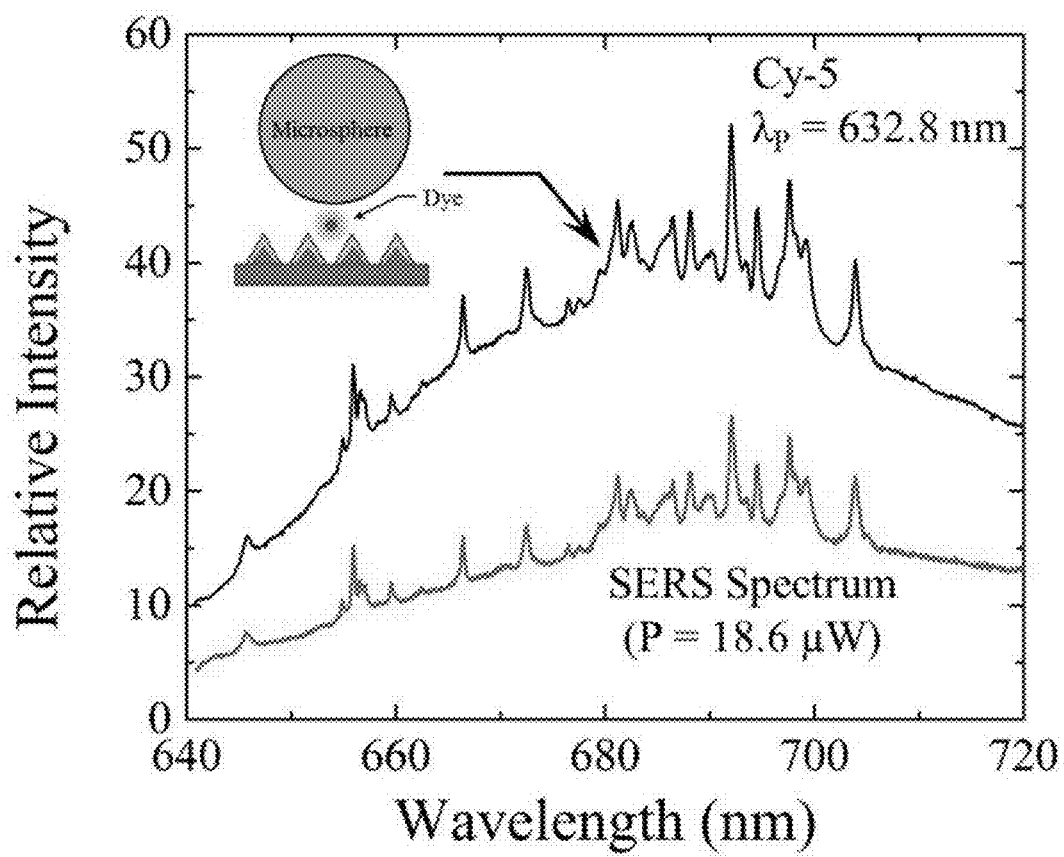
FIGS. 9A and 9B are data that illustrates the loss of amplification when the gain medium is not positioned at a predetermined distance from the micro or nano resonator surface in accordance with the invention.
Figure 9B:
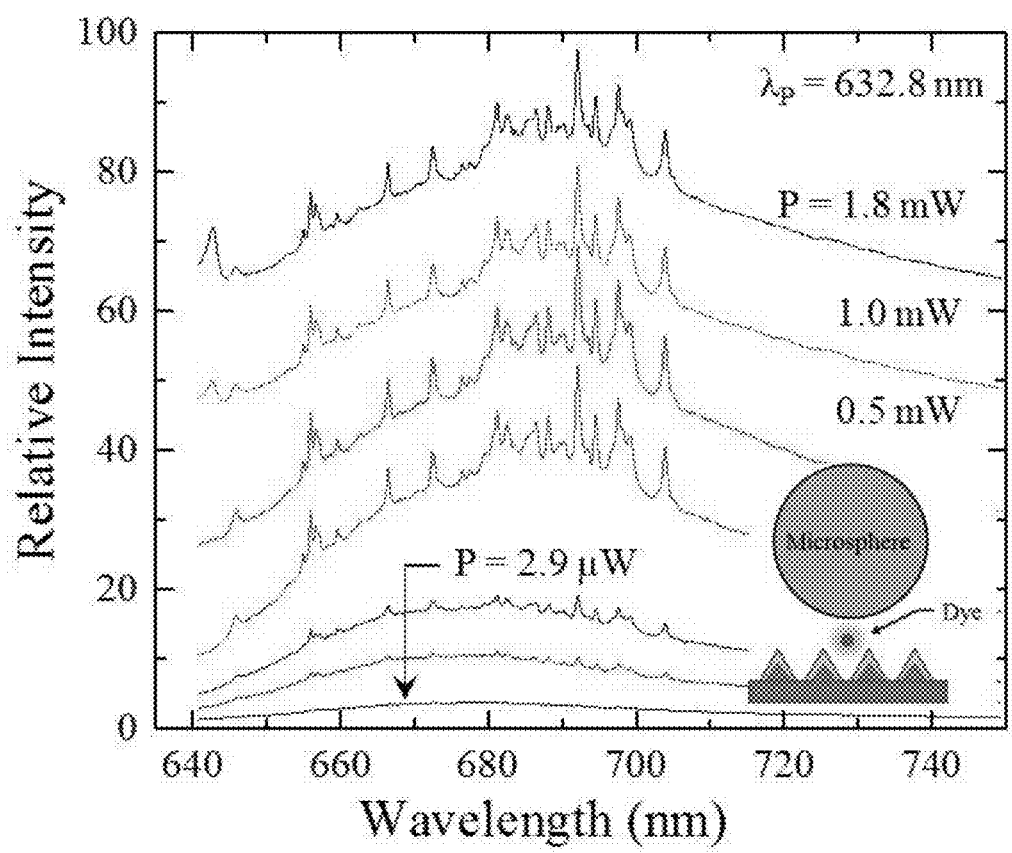

FIGS. 9A and 9B illustrate the loss of amplification when the gain medium is not positioned in accordance with the invention at a predetermined distance away from the resonator surface within the evanescent field. FIG. 9A shows that when the dye gain medium is no longer tethered to the resonator surface but rather is attached to the plasmonic surface between the microresonator and plasmonic array, the Raman lines of FIGS. 5A-6 vanish, irrespective of the pump power (measured over the range in pump power of P=2.9 µW to 1.8 mW). Superimposed onto an intense broad continuum that is characteristic of the fluorescence profile of the dye (Cy-5, in this case), the structured portion of the spectrum is no longer a signature of the resonator material (polystyrene) but rather is also generated by the dye. Similarly, the whispering gallery modes associated with the microresonator are no longer observed. FIG. 9B shows that as the excitation power is increased, no feature in the discrete spectrum FIG. 9A intensifies significantly at the expense of the others, and the relative strength of all of the narrow features remains constant. Significantly, virtually all of the power of FIG. 9A is radiated spontaneously and the background continuum is not suppressed (indeed, the underlying continuum is dominant). These observations indicate that the discrete portion of the spectra of FIG. 9A (lower trace) represents surface-enhanced Raman scattering (SERS) of the dye itself, a conclusion confirmed by the upper trace of FIG. 9A. The data of FIG. 9A show clearly that situating the dye between the microsphere and the plasmonic surface decouples the gain medium from the resonator, and the synergistic interaction of the dye, resonator, and plasmonic array in selectively amplifying specific Raman lines by channeling energy from the dye to the resonator, has been lost. In summary, tethering the dye directly to the nanoplasmonic surface yields an arrangement similar to that of prior SERS experiments employing a WGM resonator **. See, e.g., Ausman, L. K. & Schatz, G. C., "Whispering-gallery mode resonators: Surface enhanced Raman scattering without plasmons," *J. Chem. Phys.* 129, 054704 (2008); White, I., Oveys, H. & Fan, X., "Increasing the enhancement of SERS with dielectric microsphere resonators. *Spectroscopy* 21, 36-42 (2006); Zou, S. & Schatz, G. C. Combining micron-size glass spheres with silver nanoparticles to produce extraordinary field enhancements for surface-enhanced Raman scattering applications. *Isr. J. Chem.* 46, 293-297 (2006). Removing the dye from the microresonator surface and placing it at the interface between the sphere and nanoplasmonic array alters dramatically the function of the system. No longer are the WGMs of the spherical microresonator amplified, and Raman emission produced within the resonator is not detectable. Understandably, therefore, only the SERS spectrum for the dye, and its characteristic emission continuum, are observed. Both are absent when the amplifier is functioning properly.

Determining the gain of the optical amplifier is difficult because the input signal to the amplifier is the weak, internally generated Raman emission. However, an estimate can be obtained by normalizing the visible emission intensity produced by the full structure (for a specific pump power) to that generated by the equivalent number of dye molecules in solution. Because the biotin-avidin complex has a hydrodynamic diameter of 11.1±0.1 nm and an average of 1.9 dye molecules bind to each complex, then the mean number of molecules that are tethered to a 10.1 µm diameter microsphere is 1.6×10$^6$ at saturation. Consequently, only 4750 molecules are calculated to lie within the 1.25 µm$^2$ spot size of the pump laser beam at the microsphere surface Almost precisely the same number of dye molecules exists in 1 µL of a 100 nM dye solution. Comparisons of the visible emission intensity produced by the optical amplifier with that generated by the dye solution applied to a glass surface showed (for a fixed value of laser excitation power) the amplifier emission to be a factor of 1280±30 larger than that from the dye alone. Therefore, one estimate for the gain of the amplifier is ~30 dB. This estimate is likely somewhat high because the calculation ignores the fact that the dye molecules are optically excited by the portion of the pump radiation that is transmitted initially by the sphere but is scattered back into the resonator by the Ag/Si nanoarray. Nonetheless, the estimate provides an indication of strong amplification for an optical micro or nanoscale amplifier.

The effective lifetime of the dye molecules in the amplifier was also observed. The biotin-avidin tether displaces these emitter molecules ~11 nm from the surface of the sphere, and the effective lifetime of Cy-3 molecules (for example) is expected to be increased, as compared to the dye molecule in solution. Indeed, frequency-domain lifetime imaging microscopy measurements determined the excited state lifetime for the tethered Cy-3 dye molecule to be 1.5 ns, or approximately twice that for the same dye in solution. This confirms that suspending the gain medium a predetermined distance away from the resonator surface minimizes non-radiative quenching of the electronically-excited species.

Figure 10:
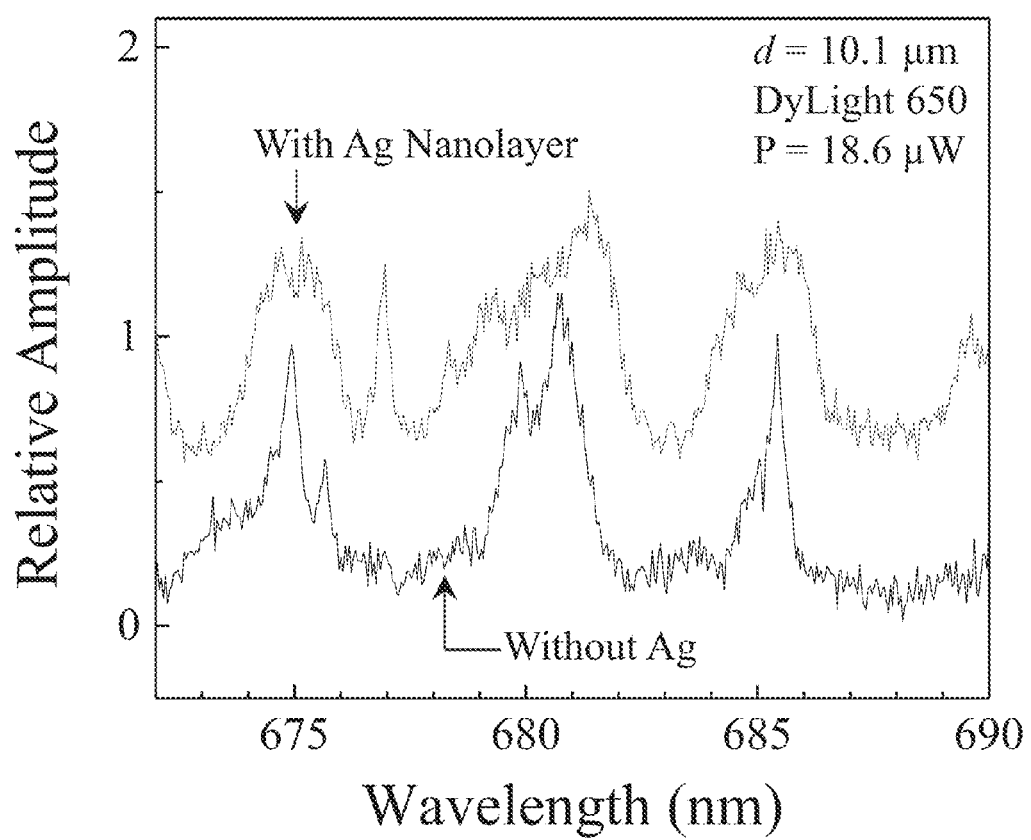
FIG. 10 presents data that quantifies the effect of the Ag nanolayer (apart from the plasmonic array of an experimental amplifier) on amplifier performance.

FIG. 10 presents data that quantify the effect of the Ag nanolayer. Spectra from amplifiers with the Ag layer removed, but including the nanocone array, confirm an expected degradation of Q that results from dissipative losses introduced by the metal. FIG. 10 compares output spectra in the 670-690 nm region that are produced by an amplifier when the Ag nanolayer is present, or has been removed. The two spectra have been separated vertically (and scaled separately) for clarity. In the upper spectrum, the reduction in Q, owing to the dissipative losses introduced by the metal (Ag), is evident. Analysis of the spectra and other data shows that the amplifier Q is decreased by a factor of ~5 when the metal nanolayer is inserted. For a comparable experimental amplifier of FIG. 1A, the amplifier Q is calculated to be 357±25 (if the impact of the injection signal is ignored), a value in agreement with FDTD calculations. When the Ag layer is removed, however, the amplifier Q rises to 1523±50. Although the Q of the amplifier falls with the introduction of the Ag nanolayer on the Si substrate, the presence of Ag strengthens significantly the amplitude of the emission spectrum of the amplifier and particularly in the 690-750 nm region. Despite the drop in Q, the full amplifier (i.e., including the Ag nanolayer) generates 50% more emission over the 650-750 nm region than does its Ag-free counterpart. Integrating over the entire spectrum, for example, shows the photon fluence (e.g., wavelength-integrated intensity) to rise by more than 50% when the Ag nanolayer is included in the amplifier structure, and the pump power is only 18.6 µW. When the incident optical power is increased to 2.01 mW, the enhancement in integrated output fluence rises to 1280. This shows that the Ag nanolayer plays a plasmonic role in the operation of the amplifier, as evidenced by the enhancement of its radiative output.

Artisans will also appreciate that the data of FIG. 10 show that the effective Q of the optical amplifier is unconstrained by the Q of the resonator itself. This is unlike conventional whispering gallery mode resonator-based devices in that the system Q can be determined by the spectral breadth of the Raman signal which, in turn, is often limited by the linewidth of the pump radiation. In FIG. 5B, for example, the Raman signal is considerably narrower than the spectral profile for the m=70 azimuthal mode of the resonator. Although the spectral width of the amplified Raman signal cannot be measured precisely at present, a lower bound for the effective Q of the amplifier at 654.3 nm is $10^5$.

In summary, a nano/micro-optical amplifier in the visible has been demonstrated in which specific Raman lines, generated internally to a spherical microresonator (or by another component of the amplifier) are amplified in an injection-seeding process that extracts power from the gain medium surrounding the resonator. The evanescent portion of the optical field circulating in the microresonator harvests energy from optically-excited dye molecules, all of which are held in close proximity to the resonator surface by a protein tether. An aperiodic (or periodic) nanoplasmonic array in physical contact with the microresonator serves to couple optical power out of, and into, the system but also to enhance the local electric field strength in the resonator, thereby accelerating the growth rate of the Raman signal and increasing the total optical power emitted by the amplifier. In this optoplasmonic amplifier (shown schematically in FIG. 7), the linewidth of the output radiation is determined primarily by the seed which, in turn, is specified by the Raman mode selected and the pump laser linewidth. Consequently, the effective Q of the amplifier is not limited by the microresonator Amplification of only specific Raman lines is achieved by matching a resonator WGM, and the gain profile of the dye, with the frequency of the Raman line of interest. Consequently, the synergistic effect of the microsphere, the nanoplasmonic surface, and the gain medium is considerably greater than that of any component alone (or any set of two). Demonstrating this amplifier concept with a weak Raman mode of the biotin-avidin tether or the Si substrate illustrates the potential of the approach for realizing optical devices suitable for generating, amplifying, and routing optical energy at the microscale. Furthermore, replacing dye with other gain media, such as rare earth-doped nanocrystals having atomic transitions with upper state lifetimes considerably larger than those for the excited singlet states of dyes (a few ns), will improve significantly the energy storage capabilities of the amplifier. Specifically, optimal energy storage in, and output power of, this amplifier is expected when the photon lifetime $\tau_p \equiv Q/\omega$ of the optical resonator is matched to the excited state lifetime for the gain medium. It should also be mentioned that the structure and emission characteristics of this amplifier suggest the feasibility of embedding one or more within tissue or another highly-scattering biological or inorganic medium. Capable of being photopumped from outside the medium in which it is buried, this amplifier (or arrays of amplifiers) can serve as an in situ diagnostic of biological or chemical activity.

Additional experiments showed that quantum dots can also serve as gain media (in place of dyes). Tethering red-emitting quantum dots, for example, to a microsphere with biotin/avidin protein results in strong WGM emission spectra.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An injection seeded whispering gallery mode optical amplifier comprising:
    a plasmonic surface;
    a micro or nanoscale whispering gallery mode resonator on said plasmonic surface;
    a gain medium located a predetermined distance away from said whispering gallery mode resonator, wherein the predetermined distance is within an evanescent field of said whispering gallery mode resonator and wherein said gain medium has a gain spectrum that encompasses a Raman line of said whispering gallery mode resonator; and
    an optical pump disposed to irradiate said whispering gallery mode resonator, wherein said optical pump is capable of generating radiation that stimulates a non-linear optical process within said whispering gallery mode resonator.

2. The amplifier of claim 1, wherein said whispering gallery mode resonator comprises a microsphere.

3. The amplifier of claim 2, wherein said microsphere comprises a polymer microsphere.

4. The amplifier of claim 3, wherein said microsphere comprises a polystyrene micro sphere.

5. The amplifier of claim 4, wherein said microsphere comprises a microsphere having a diameter in the range of several hundred nanometers to several hundred micrometers.

6. The amplifier of claim 5, wherein said microsphere comprises a diameter of ~50 µm or less.

7. The amplifier of claim 2, wherein said microsphere comprises a glass microsphere.

8. The amplifier of claim 2, wherein said microsphere comprises a crystalline microsphere.

9. The amplifier of claim 2, wherein said plasmonic surface comprises a plasmonic array including an array of nanostructures.

10. The amplifier of claim 9, wherein said nanostructures comprise nanocones.

11. The amplifier of claim 9, wherein said plasmonic array comprises a thin film metal coating on said array of nanostructures.

12. The amplifier of claim 11, wherein said nanostructures comprise nanoglobules.

13. The amplifier of claim 11, wherein said thin film metal coating comprises an Ag nanolayer coating.

14. The amplifier of claim 1, wherein said gain medium comprises dye molecules.

15. The amplifier of claim 14, wherein said dye molecules are tethered to said whispering gallery mode resonator.

16. The amplifier of claim 15, wherein said dye molecules are tethered by a protein to said whispering gallery mode resonator.

17. The amplifier of claim 15, wherein said protein comprises biotin/avidin.

18. The amplifier of claim 1, wherein said gain medium comprises quantum dots.

19. The amplifier of claim 1, wherein said whispering gallery mode resonator comprises a rod or a disc with a nanoscale or microscale diameter.

20. An injection seeded whispering gallery mode optical amplifier comprising:
 means for resonating and containing a whispering gallery optical mode or modes in a microscale or nanoscale volume;
 means for stimulating the whispering gallery mode;
 means for amplifying the whispering gallery mode through the evanescent field of the whispering gallery mode; and
 a micro or nanoscale whispering gallery mode resonator on said plasmonic array; and
 means for coupling power into and out of said means for resonating.

21. The amplifier of claim 20, wherein said means for coupling further strengthens an electric field in the volume.

22. The amplifier of claim 21, wherein the whispering gallery mode coincides with a predetermined Raman line and said means for resonating discriminates against all other modes.

23. The amplifier of claim 21, wherein said means for resonating resonates and contains a plurality of whispering gallery modes and said means for contributing gain amplifies the plurality of whispering gallery modes.

24. An optical network, comprising:
 an injection seeded whispering gallery mode optical amplifier that stimulates a whispering gallery mode in a micro or nanoscale whispering gallery mode resonator by irradiating said whispering gallery mode resonator and amplifies the whispering gallery mode resonator via a gain medium separated from the whispering gallery mode resonator but within the evanescent field of the whispering gallery mode resonator; and
 a transmission medium comprising an additional whispering gallery mode resonator that receives optical power from said injection-seeded whispering gallery mode optical amplifier.

25. The optical network of claim 24, wherein said transmission medium comprises a plurality of additional whispering gallery mode resonators.

26. The optical network of claim 25, comprising a plurality of transmission media with a plurality of injection-seeded whispering gallery mode optical amplifiers therebetween.

27. The optical network of claim 24, wherein said injection-seeded whispering gallery mode optical amplifier and said transmission medium are upon a plasmonic surface.

28. An injection-seeded whispering gallery mode optical amplifier comprising:
 a micro or nanoscale whispering gallery mode resonator configured to amplify a whispering gallery mode therein via a gain medium separated from the whispering gallery mode resonator but within the evanescent field of the whispering gallery mode resonator;
 a pump for stimulating the whispering gallery mode by irradiating said whispering gallery mode resonator; and
 a plasmonic surface for coupling power into the whispering gallery mode resonator.

* * * * *